US011943717B2

(12) United States Patent
Lee et al.

(10) Patent No.: US 11,943,717 B2
(45) Date of Patent: Mar. 26, 2024

(54) ELECTRONIC DEVICE TRANSMITTING REFERENCE SIGNAL AND METHOD FOR OPERATING THE SAME

(71) Applicant: Samsung Electronics Co., Ltd., Suwon-si (KR)

(72) Inventors: Kyoungho Lee, Suwon-si (KR); Sungsick Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 17/509,390

(22) Filed: Oct. 25, 2021

(65) Prior Publication Data

US 2022/0132434 A1 Apr. 28, 2022

(30) Foreign Application Priority Data

Oct. 26, 2020 (KR) .................. 10-2020-0139094

(51) Int. Cl.
*H04W 52/20* (2009.01)
*H04L 5/00* (2006.01)

(52) U.S. Cl.
CPC ........... *H04W 52/20* (2013.01); *H04L 5/0048* (2013.01)

(58) Field of Classification Search
CPC ............................. H04W 52/20; H04L 5/0048
See application file for complete search history.

(56) References Cited

U.S. PATENT DOCUMENTS

| 9,892,344 | B1* | 2/2018 | Tran ..................... G06V 10/82 |
| 2011/0294529 | A1 | 12/2011 | Luo et al. | |
| 2017/0318554 | A1* | 11/2017 | Kim .......................... G01S 1/20 |
| 2018/0368098 | A1* | 12/2018 | Gopal ................... H04W 68/02 |
| 2019/0065896 | A1* | 2/2019 | Lee ......................... G06N 3/045 |
| 2019/0363866 | A1* | 11/2019 | Gaal ....................... H04L 5/1469 |
| 2020/0350970 | A1* | 11/2020 | Liu ........................ H04B 7/0628 |
| 2020/0382250 | A1* | 12/2020 | Choi ....................... H04W 72/21 |
| 2022/0069873 | A1* | 3/2022 | Gopal ................... H04B 7/0469 |
| 2022/0376858 | A1* | 11/2022 | Afana ..................... H04L 5/001 |

FOREIGN PATENT DOCUMENTS

KR 10-2014-0040858 A1 4/2014

* cited by examiner

*Primary Examiner* — Raymond S Dean
(74) *Attorney, Agent, or Firm* — Jefferson IP Law, LLP

(57) ABSTRACT

An electronic device is provided. The electronic device includes a plurality of antennas and at least one processor configured to support long-term evolution (LTE) communication and new radio (NR) communication. The at least one processor may be configured to identify at least one time of transmission of a sounding reference signal (SRS) set in the NR communication, transmitted through each of the plurality of antennas, identify at least one time of the LTE communication corresponding to the at least one time of transmission of the SRS, identify a block error rate (BLER) of the LTE communication in at least one frequency band associated with the LTE communication simultaneously in use with the NR communication, at the at least one time of the LTE communication, and based on the BLER satisfying a designated condition, perform an SRS restriction operation.

21 Claims, 21 Drawing Sheets

ELECTRONIC DEVICE TRANSMITTING REFERENCE SIGNAL AND METHOD FOR OPERATING THE SAME

CROSS-REFERENCE TO RELATED APPLICATION(S)

This application is based on and claims priority under 35 U.S.C. § 119(a) of a Korean patent application number 10-2020-0139094, filed on Oct. 26, 2020, in the Korean Intellectual Property Office, the disclosure of which is incorporated by reference herein in its entirety.

BACKGROUND

1. Field

The disclosure relates to an electronic device transmitting a reference signal and a method for operating the same.

2. Description of Related Art

As mobile communication technology evolves, multi-functional portable terminals are commonplace and, to meet increasing demand for radio traffic, vigorous efforts are underway to develop 5th generation (5G) communication systems. To achieve a higher data transmission rate, 5G communication systems are being implemented on higher frequency bands (e.g., a band of 25 GHz to 60 GHz) as well as those used for 3rd generation (3G) communication systems and long-term evolution (LTE) communication systems.

To implement 5G communication, stand-alone (SA) and non-stand alone (NSA) schemes are taken into consideration. Of the two, the NSA scheme may include an E-UTRA NR dual connectivity (EN-DC) scheme that uses the new radio (NR) system along with the legacy LTE system. In the NSA scheme, user equipment (UE) may use not only eNBs of the LTE system but also gNBs of the NR system. Technology allowing UEs to use heterogeneous communication systems may be termed dual connectivity. A 5G EN-DC scheme implements dual connectivity as proposed in 3GPP release-12 by adopting LTE network communication as a master node and NR network communication as a secondary node.

An electronic device may transmit, through at least one antenna, a reference signal (e.g., a sounding reference signal (SRS)) referenced for channel estimation by a base station in a communication network. The base station may perform multi-antenna signal processing or beamforming processing by estimating the channel based on the reference signal transmitted from the electronic device. The electronic device may enhance data reception performance by receiving a multi-antenna signal-processed or beamformed signal from the base station.

The above information is presented as background information only to assist with an understanding of the disclosure. No determination has been made, and no assertion is made, as to whether any of the above might be applicable as prior art with regard to the disclosure.

SUMMARY

When communication is performed based on a plurality of frequency bands, SRS transmission may be performed based on any one frequency band, and SRS transmission may not be performed in the other frequency bands. For a high gain of data throughput through SRS, the electronic device may set as large SRS transmission power as possible. When a radio frequency (RF) path for processing of any one frequency band is not completely isolated from an RF path for processing of another frequency band, noise caused by SRS may affect processing of the other frequency band. Accordingly, the quality of downlink in the second frequency band may be degraded by the SRS transmission in the first frequency band.

Aspects of the disclosure are to address at least the above-mentioned problems and/or disadvantages and to provide at least the advantages described below. Accordingly, an aspect of the disclosure is to provide an electronic device and a method for operating the electronic device may restrict SRS transmission in a first RAT based on identification of downlink quality degradation in a second RAT due to the SRS transmission in the first RAT.

Additional aspects will be set forth in part in the description which follows and, in part, will be apparent from the description, or may be learned by practice of the presented embodiments.

In accordance with an aspect of the disclosure, an electronic device is provided. The electronic device includes a plurality of antennas and at least one processor configured to support long-term evolution (LTE) communication and new radio (NR) communication. The at least one processor may be configured to identify at least one time of transmission of a sounding reference signal (SRS) set in the NR communication, transmitted through each of the plurality of antennas, identify at least one time of the LTE communication corresponding to the at least one time of transmission of the SRS, identify a block error rate (BLER) of the LTE communication in at least one frequency band associated with the LTE communication simultaneously in use with the NR communication, at the at least one time of the LTE communication, and based on the BLER satisfying a designated condition, perform an SRS restriction operation.

In accordance with another aspect of the disclosure, a method for operating an electronic device is provided. The method includes a plurality of antennas supporting new radio (NR) communication and long-term evolution (LTE) communication comprises identifying at least one time of transmission of a sounding reference signal (SRS) set in the NR communication, transmitted through each of the plurality of antennas, identifying at least one time of the LTE communication corresponding to the at least one time of transmission of the SRS, identifying a block error rate (BLER) of the LTE communication in at least one frequency band associated with the LTE communication simultaneously in use with the NR communication, at the at least one time of the LTE communication, and based on the BLER satisfying a designated condition, performing an SRS restriction operation.

According to various embodiments, there may be provided an electronic device and a method for operating the electronic device may restrict SRS transmission in a first RAT based on identification of downlink quality degradation in a second RAT due to the SRS transmission in the first RAT. Accordingly, degradation of downlink quality in the second RAT may be prevented, and thus degradation of overall data throughput of the electronic device may be prevented.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
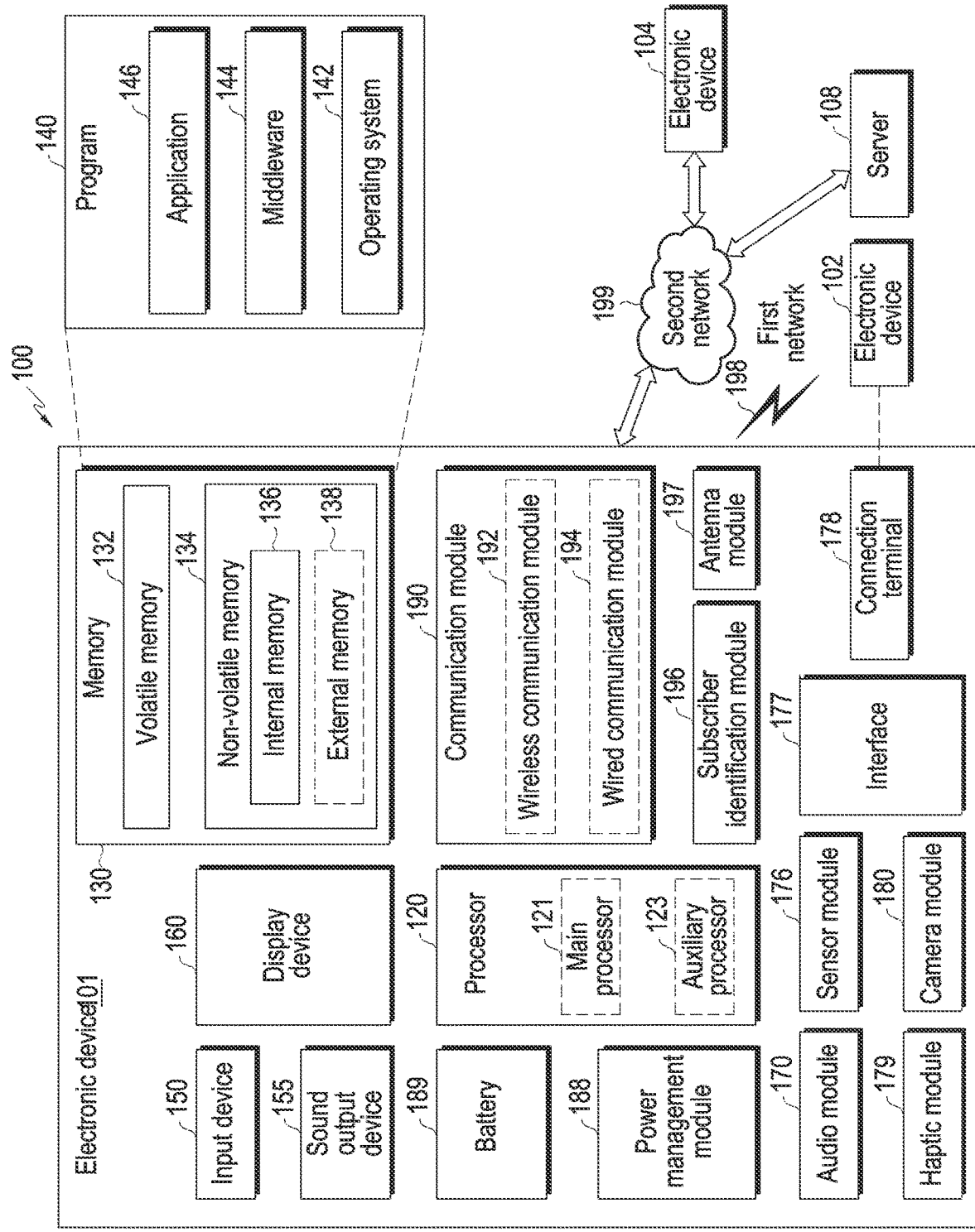
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
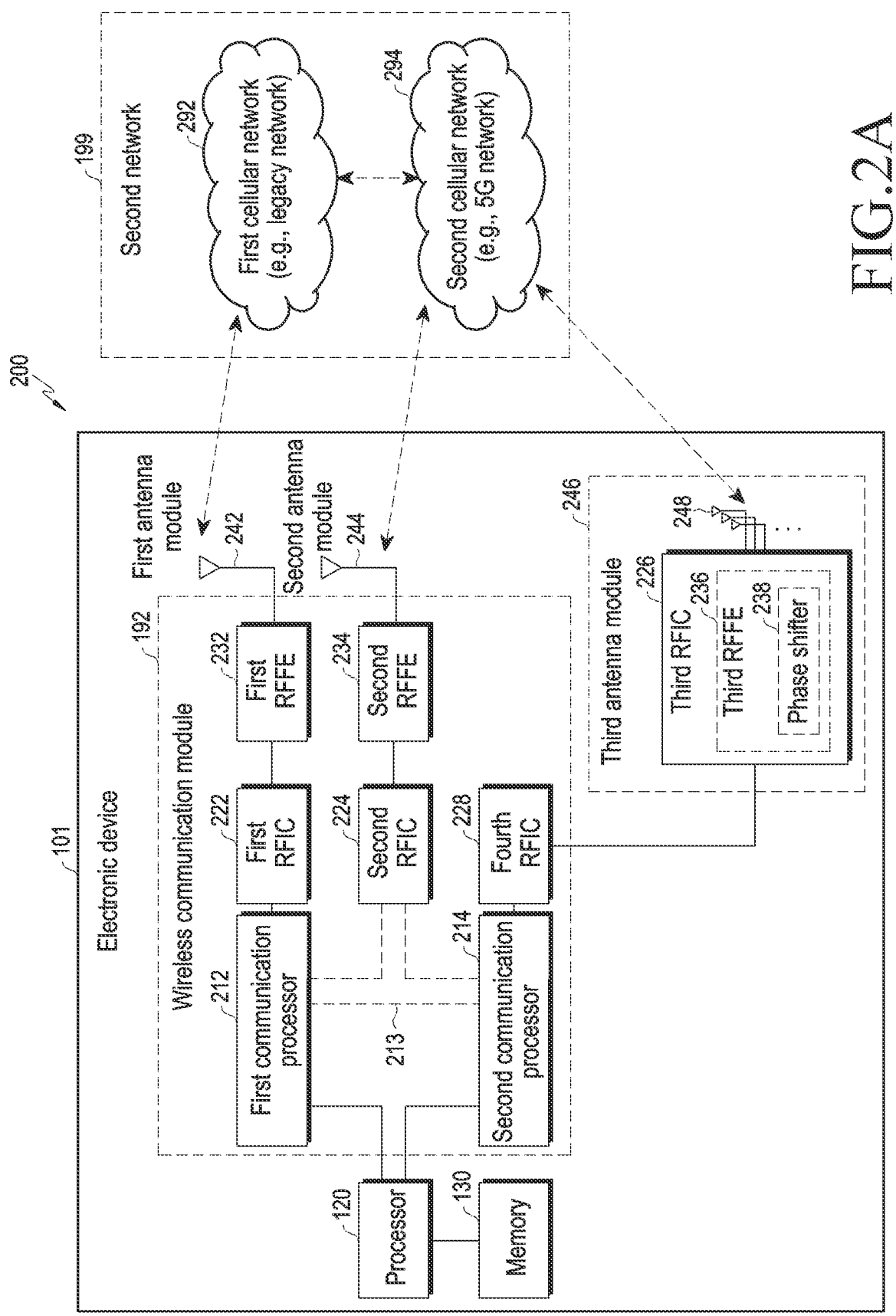
FIGS. 2A and 2B are block diagrams illustrating an electronic device for supporting legacy network communication and 5G network communication according to various embodiments of the disclosure.

FIG. 2A is a block diagram 200 illustrating an electronic device 101 for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package. According to an embodiment, the first communication processor 212 or the second communication processor 214, along with the processor 120, an auxiliary processor 123, or communication module 190, may be formed in a single chip or single package.

Figure 2B:
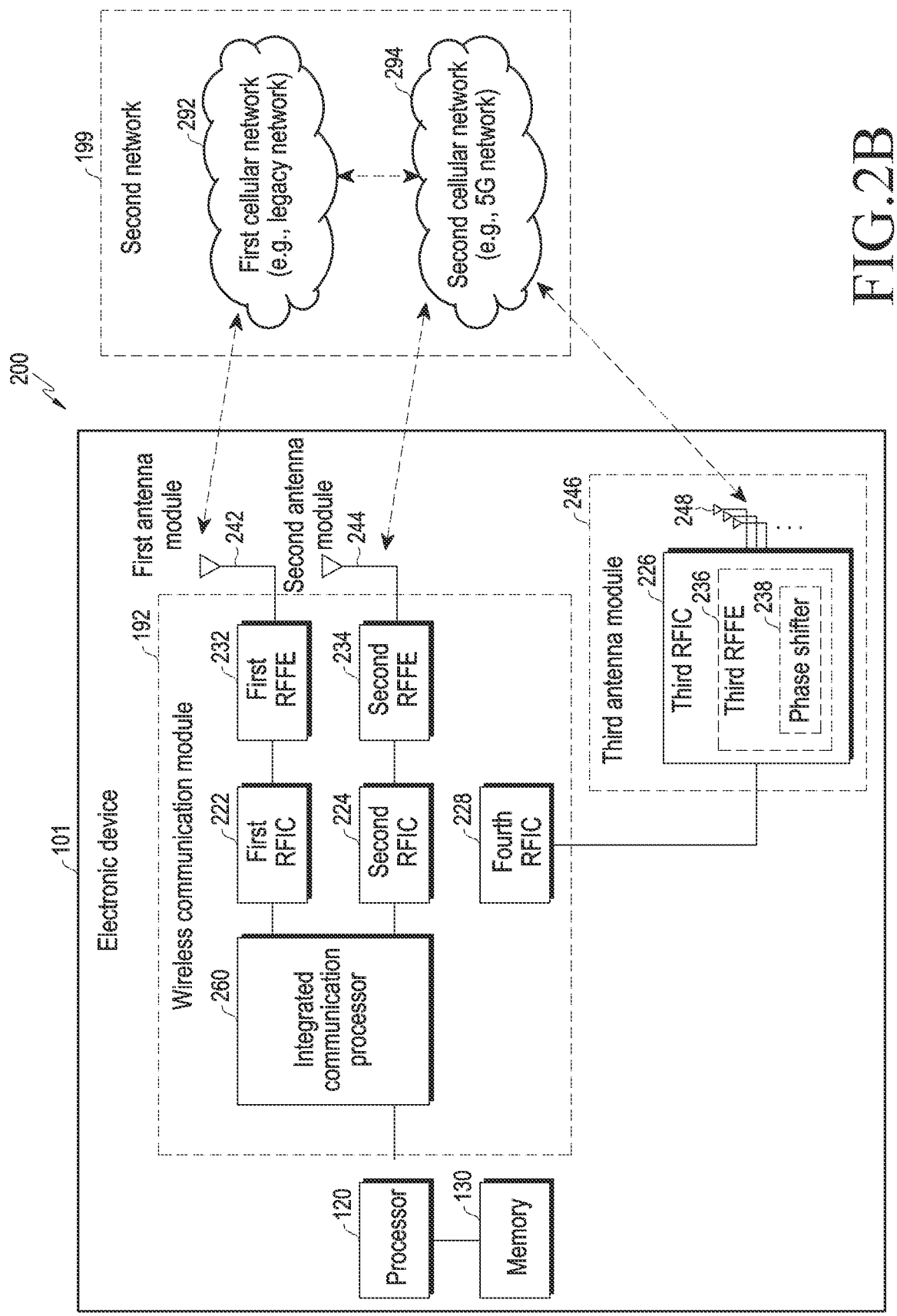

For example, referring to FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3:
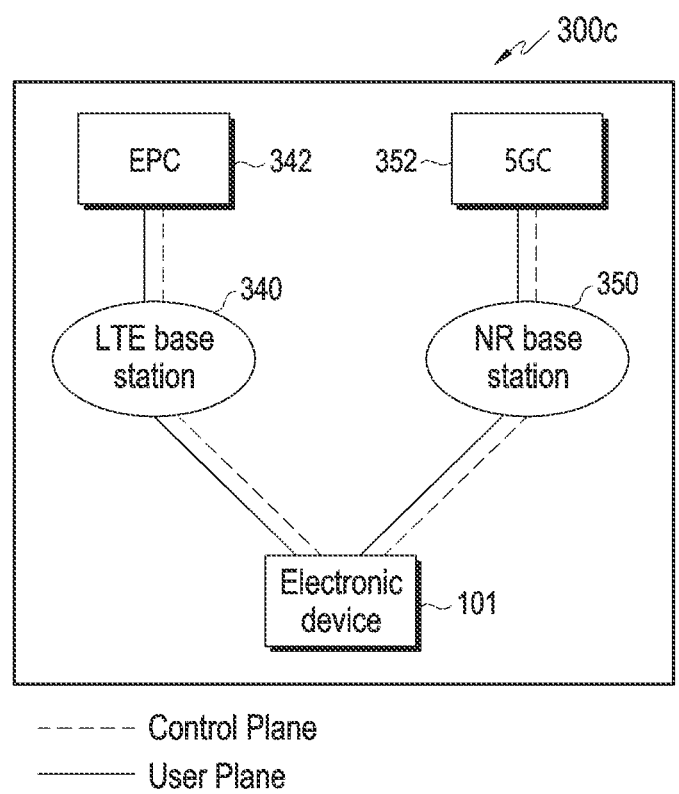
FIG. 3 is a view illustrating wireless communication systems providing a legacy communication network and/or a 5G communication network according to an embodiment of the disclosure.

FIG. 3 is a view illustrating wireless communication systems providing a legacy communication network and/or a 5G communication network according to an embodiment of the disclosure.

Referring to FIG. 3, the network environment 300c may include at least one of a legacy network and a 5G network. The legacy network may include, e.g., a 3GPP-standard 4G or LTE base station (e.g., an eNodeB (eNB)) 340 that supports radio access with the electronic device 101 and an evolved packet core (EPC) 342 that manages 4G communication. The 5G network may include, e.g., a new radio (NR) base station (e.g., a gNodeB (gNB)) 350 that supports radio access with the electronic device 101 and a 5th generation core (5GC) 352 that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC).

Referring to FIG. 3, according to an embodiment, the electronic device 101 may transmit or receive at least one of a control message or user data to/from at least part (e.g., the NR base station or 5GC) of the 5G network via at least part (e.g., the LTE base station or EPC) of the legacy network.

According to an embodiment, the network environment 300c may include a network environment that provides wireless communication dual connectivity (DC) to the LTE base station and the NR base station and transmits or receives control messages to/from the electronic device 101 via one core network 330 of the EPC or the 5GC.

According to an embodiment, in the DC environment, one of the LTE base station or the NR base station may operate as a master node (MN) 310, and the other as a secondary node (SN) 320. The MN 310 may be connected with the core network 330 to transmit or receive control messages. The MN 310 and the SN 320 may be connected with each other via a network interface to transmit or receive messages related to radio resource (e.g., communication channel) management therebetween.

According to an embodiment, in E-UTRA new radio dual connectivity (EN-DC), the MN 310 may include the LTE base station, the SN may include the NR base station, and the core network 330 may include the EPC. For example, control messages may be transmitted/received via the LTE base station and the EPC, and user data may be transmitted/received at least one of the LTE base station or the NR base station.

According to an embodiment, in new radio dual E-UTRA connectivity (NE-DC), the MN 310 may include the NR base station, the SN 320 may include the LTE base station, and the core network 330 may include the 5GC. For example, control messages may be transmitted/received via the NR base station and the 5GC, and user data may be transmitted/received at least one of the LTE base station or the NR base station.

According to an embodiment, the electronic device 101 may be registered in at least one of the EPC or the 5GC to transmit or receive control messages.

According to an embodiment, the EPC or the 5GC may interwork with each other to manage communication for the electronic device 101. For example, mobility information for the electronic device 101 may be transmitted or received via the interface between the EPC and the 5GC.

Besides the EN-DC, the MR DC may have other various applications. For example, a first network and a second network by the MR DC may be both related to LTE communication, and the second network may be a network corresponding to a small cell of a specific frequency. For example, the first network and the second network by the MR DC may be both related to 5G, and the first network may correspond to a frequency band (e.g., below 6) less than 6 GHz, and the second network may correspond to a frequency band (e.g., over 6) not less than 6 GHz. It will be easily appreciated by one of ordinary skill in the art that other various dual-connectivity-applicable network structures may be applied to embodiments of the disclosure.

Figure 4A:
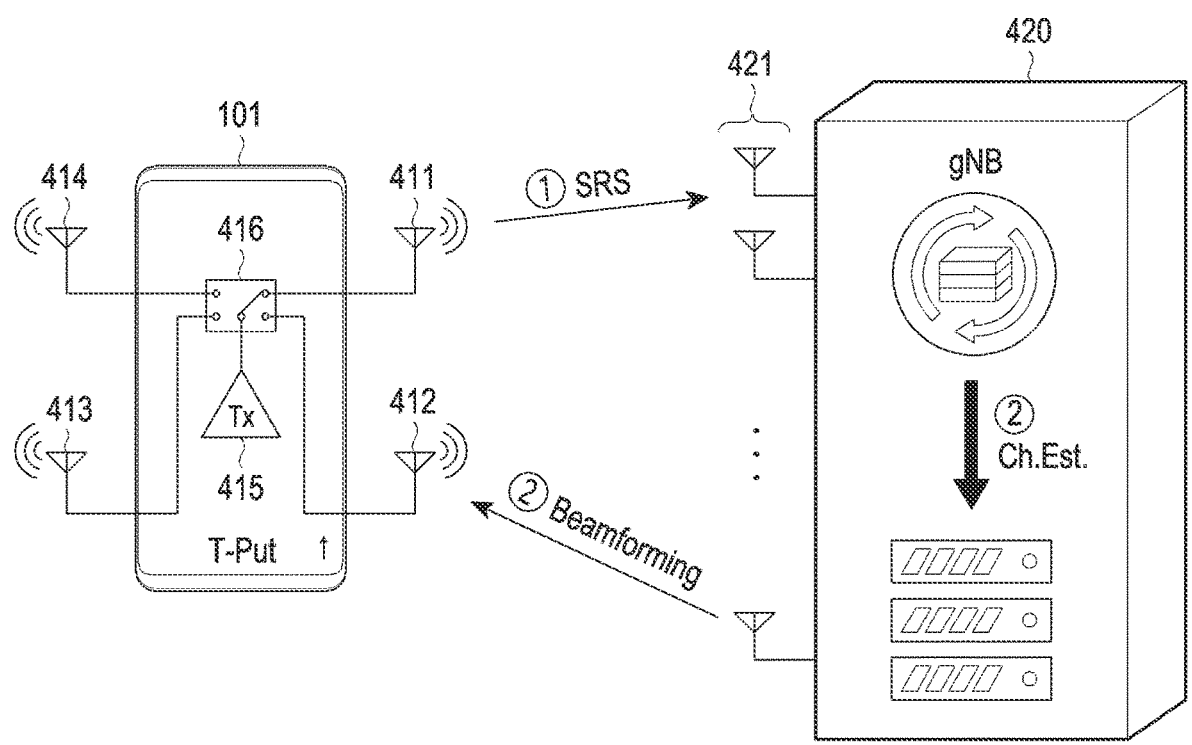
FIGS. 4A and 4B are views illustrating transmission of a reference signal by an electronic device according to various embodiments of the disclosure.

FIG. 4A is a view illustrating transmission of a reference signal by an electronic device according to an embodiment of the disclosure.

Referring to FIG. 4A, an electronic device 101 (e.g., the electronic device 101 of FIG. 1) may transmit a reference signal (e.g., an SRS) through four antennas (e.g., a first antenna 411, a second antenna 412, a third antenna 413, and a fourth antenna 414). For example, the electronic device 101 may amplify the reference signal through at least one power amplifier (PA) 415 and may transmit the amplified reference signal to the first antenna 411, the second antenna 412, the third antenna 413, and the fourth antenna 414 through at least one switch 416. The reference signal (e.g., an SRS) transmitted through each antenna (e.g., the first antenna 411, the second antenna 412, the third antenna 413, and the fourth antenna 414) of the electronic device 101 may be received through each antenna 421 of a base station 420 (e.g., a gNB).

According to various embodiments, the base station 420 may receive the reference signal transmitted from the electronic device 101 and may estimate the channel for each antenna (e.g., the first antenna 411, the second antenna 412, the third antenna 413, and the fourth antenna 414) of the electronic device 101 from the received reference signal. The base station 420 may transmit a precoded downlink signal to the electronic device 101 based on the channel estimation. For example, the electronic device 101 and the base station 420 may perform MIMO communication. According to various embodiments, the base station 420 may perform beamforming based on channel estimation in an FR2 band.

Although FIG. 4A illustrates one power amplifier 415 and one switch 416 connected with a plurality of antennas (a first antenna 411, a second antenna 412, a third antenna 413, and a fourth antenna 414) for ease of description, it will readily be appreciated by one of ordinary skill in the art that embodiments of the disclosure are not limited thereto.

Figure 4B:
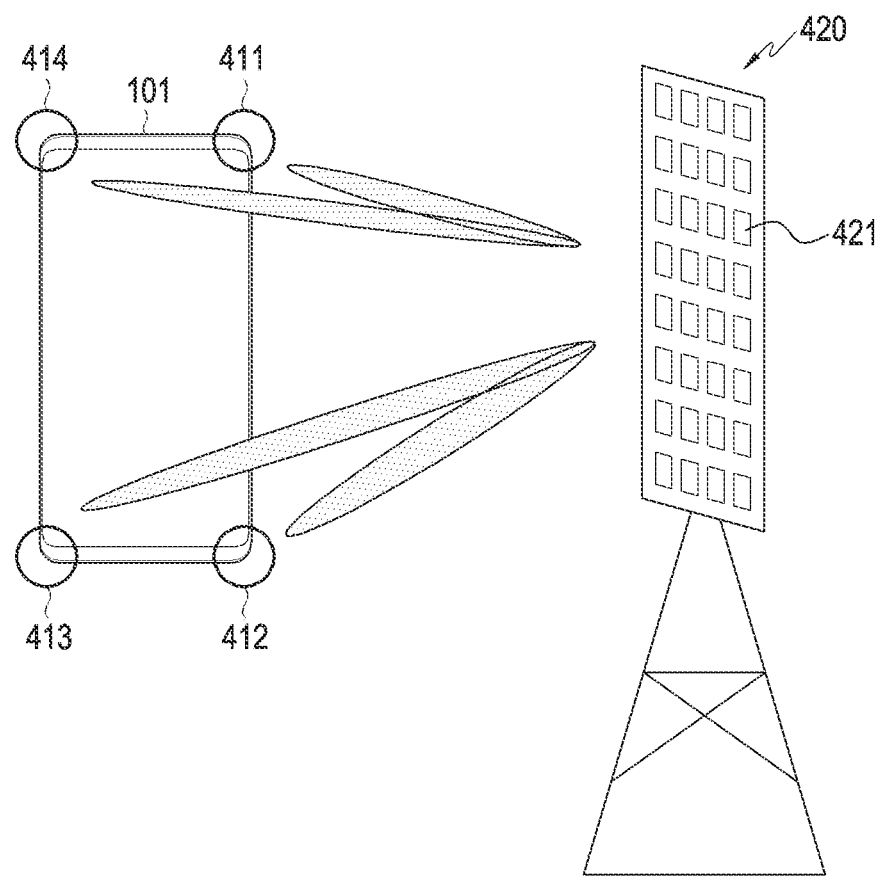

Referring to FIG. 4B, if the electronic device 101 transmits a reference signal (e.g., an SRS) through a plurality of transmission paths, the base station 420 may identify the channel environment with each antenna (e.g., the first antenna 411, the second antenna 412, the third antenna 413, and the fourth antenna 414)) of the electronic device 101 and may use the identified channel environment for precoding (or beamforming), enhancing the reference signal received power (RSRP) and/or signal to noise ratio (SNR) of the downlink channel. If the RSRP and/or SNR of the downlink channel is enhanced, the rank index (RI) or channel quality indicator (CQI) for the electronic device may be increased. The base station 420 allocates a high rank or modulation and code schemes (MCS) to the electronic device 101 based on the enhanced performance of the electronic device 101 so that the downlink throughput of the electronic device 101 may be enhanced.

According to various embodiments, the base station 420 may use a downlink reference signal for downlink channel estimation. For example, if the base station 420 transmits the downlink reference signal to the electronic device 101, the electronic device 101 may receive the downlink reference signal transmitted from the base station 420 and perform channel estimation. The electronic device 101 may transmit the result of channel estimation to the base station 420, and the base station 420 may perform downlink beamforming with reference to the result of the channel estimation transmitted from the electronic device 101. According to various embodiments, when the base station 420 performs channel estimation by the reference signal (e.g., an SRS) transmitted from the electronic device 101, channel estimation may be performed faster than the channel estimation by the downlink reference signal, According to various embodiments, a first communication network (e.g., a base station (gNB)) or a second communication network (e.g., a base station (gNB)) may send a request for various configuration information for the electronic device 101 by transmitting a UE capability enquiry message to the electronic device 101. For example, a first communication network (e.g., a base station (gNB)) or a second communication network (e.g., a base station (eNB)) may send a request for information related to the reception antenna of the electronic device 101 through the UE capability enquiry message. The electronic device 101 may receive the UE capability enquiry message from the first communication network or the second communication network and, in response thereto, may transmit a UE capability information message to the first communication network or the second communication network. According to various embodiments, information related to the reception antenna of the electronic device 101, such as 'supportedSRS-Tx-PortSwitch t1r4,' may be included in the UE capability information message, according to the content of the UE capability enquiry message.

As the antenna-related information is specified as 'supportedSRS-TxPortSwitch t1r4', the first communication network may determine that the electronic device 101 may transmit signals using four reception antennas and transmit an RRC reconfiguration message including information for the time of transmission of a reference signal (e.g., an SRS) for each of the four antennas.

Figure 5:
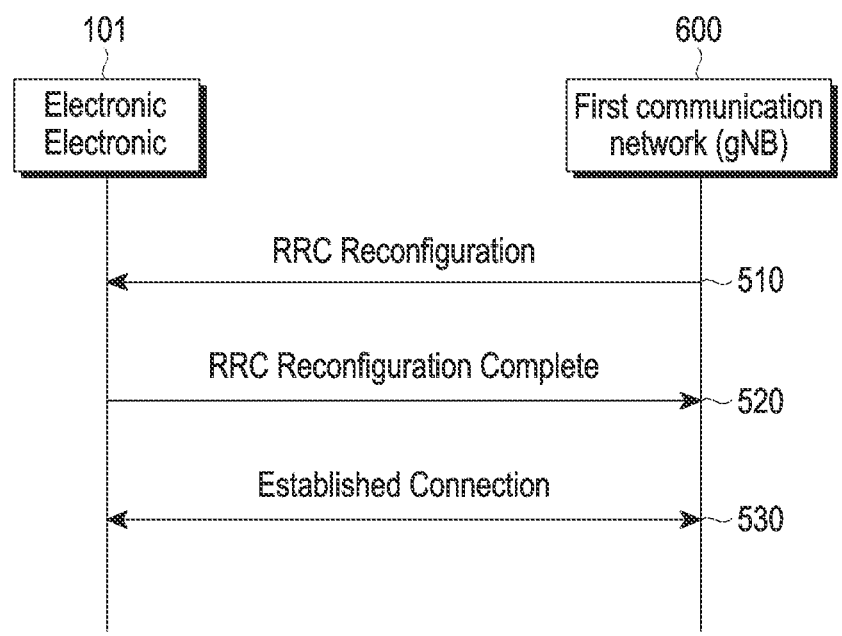
FIG. 5 is a flowchart illustrating a signal transmission/reception procedure between an electronic device and a communication network according to an embodiment of the disclosure.

FIG. 5 is a flowchart illustrating a signal transmission/reception procedure between an electronic device and a communication network according to an embodiment of the disclosure.

Referring to FIG. 5, an electronic device 101 may establish an RRC connection with a first communication network (e.g., a base station (gNB)) 600 through a random access channel (RACH) procedure.

According to various embodiments, in operation 510, the first communication network 500 may transmit an RRC reconfiguration message to the electronic device 101. For example, the first communication network 500 may transmit an RRC reconfiguration message in response to the RRC request message transmitted by the electronic device 101. As described above, the RRC reconfiguration message may include information regarding a time at which the electronic device 101 transmits a reference signal (e.g., an SRS) through each antenna as follows.

perodicityAndOffset-p s120:17
    perodicityAndOffset-p s120:7
    perodicityAndOffset-p s 120:13
    perodicityAndOffset-p s120:3
    nrofSymbols n1

Referring to the RRC reconfiguration message, it may be seen that as specified as "nrofSymbols n1.", the duration of SRS transmission may be determined as an allocated symbol. Further, referring to the RRC reconfiguration message, as specified as "periodicityAndOffset-p s120:17", the first SRS may be set to be transmitted in the 17th slot while being transmitted once every 20 slots. As specified as "periodicityAndOffset-p s120:7", the second SRS may be set to be transmitted in the 7th slot while being transmitted once every 20 slots. As specified as "periodicityAndOffset-p s120:13", the third SRS is transmitted in the 13th slot while being transmitted once every 20 slots. As specified as "periodicityAndOffset-p s120:3", the fourth SRS is set to be transmitted in the 3rd slot while being transmitted once every 20 slots.

According to various embodiments, the electronic device 101 may transmit four SRSs at different times through the respective antennas every 20 slots according to the configuration of RRC reconfiguration. The size of one slot may be determined by the subcarrier spacing (SCS). For example, when the SCS is 30 KHz, the time interval of one slot may be 0.5 ms, and the time interval of 20 slots may be 10 ms. Accordingly, the electronic device 101 may repeatedly transmit the SRS at different times through the respective antennas every 10 ms. According to various embodiments, one slot may include 14 symbols and, assuming that one symbol is allocated for one SRS transmission, it may have a symbol duration (or symbol enable time) of $0.5\ ms*1/14=35$ μs (0.035 ms).

According to various embodiments, in operation 520, the electronic device 101 may transmit an RRC reconfiguration complete message to the first communication network 500. As the RRC reconfiguration procedure is normally completed, in operation 530, the electronic device 101 and the first communication network 600 may complete RRC connection establishment.

According to various embodiments, as described above, the electronic device 101 may transmit reference signals at different times for each time period (e.g., 10 ms) set through each antenna transmission path based on information regarding the transmission time of the reference signal (e.g., an SRS) received from the first communication network 500 as described above.

Figure 6:
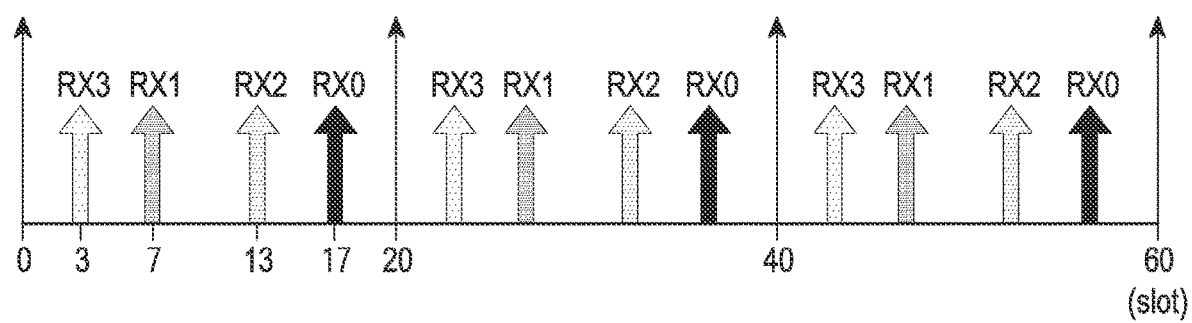
FIG. 6 is a view illustrating a transmission period of a reference signal according to an embodiment of the disclosure.

FIG. 6 is a view illustrating a transmission period of a reference signal according to an embodiment of the disclosure.

Referring to FIG. 6, e.g., the electronic device 101 may transmit the first SRS in the 17th slot among 20 slots every 10 ms, the second SRS in the 7th slot, the third SRS in the 13th slot, and the fourth SRS in the third slot. For example, the electronic device 101 may include four reception antennas, supporting 1T4R (e.g., a scenario in which among the four antennas, one antenna is mapped for transmission purposes). The electronic device 101 may transmit an SRS signal through each of four reception antennas (e.g., RX0, RX1, RX2, and RX3 of FIG. 6).

According to various embodiments, the reference signal may be a sounding reference signal (SRS) used for multi-antenna signal processing (e.g., multi input multi output (MIMO) or beamforming) through uplink channel state measurement, but embodiments of the disclosure are not limited thereto. For example, although SRS is used as an example of the reference signal in the above description or the following description, any type of uplink reference signal (e.g., uplink demodulation reference signal (DM-RS)) transmitted from the electronic device 101 to the base station signal may be included in the reference signal described below.

Figure 7:
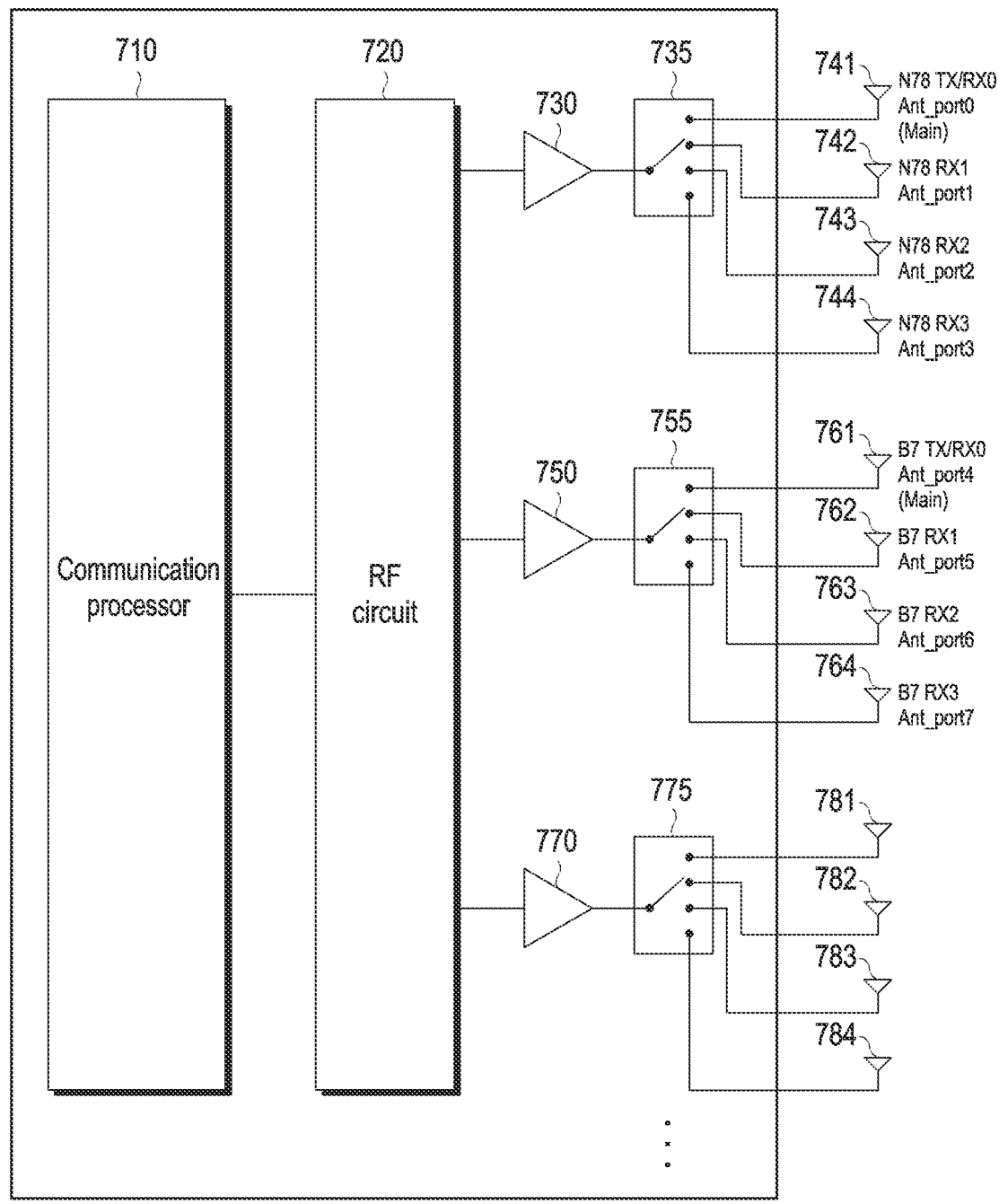
FIG. 7 is a block diagram illustrating an electronic device according to an embodiment of the disclosure.

FIG. 7 is a block diagram illustrating an electronic device according to an embodiment of the disclosure.

The embodiment of FIG. 7 is described with reference to FIGS. 8A to 8D.

Figure 8A:
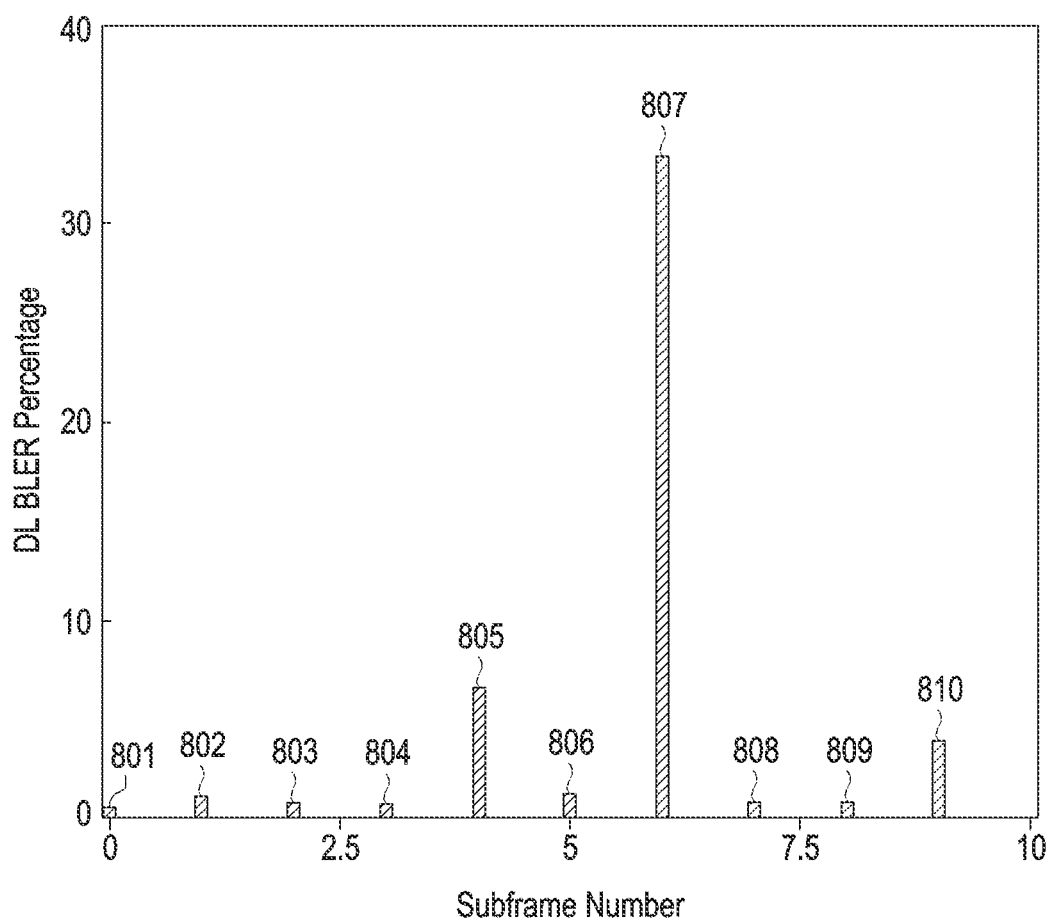
FIGS. 8A and 8B illustrate block error rates (BLERs) measured in a plurality of frequency bands while SRS transmission is performed according to various embodiments of the disclosure.
Figure 8B:
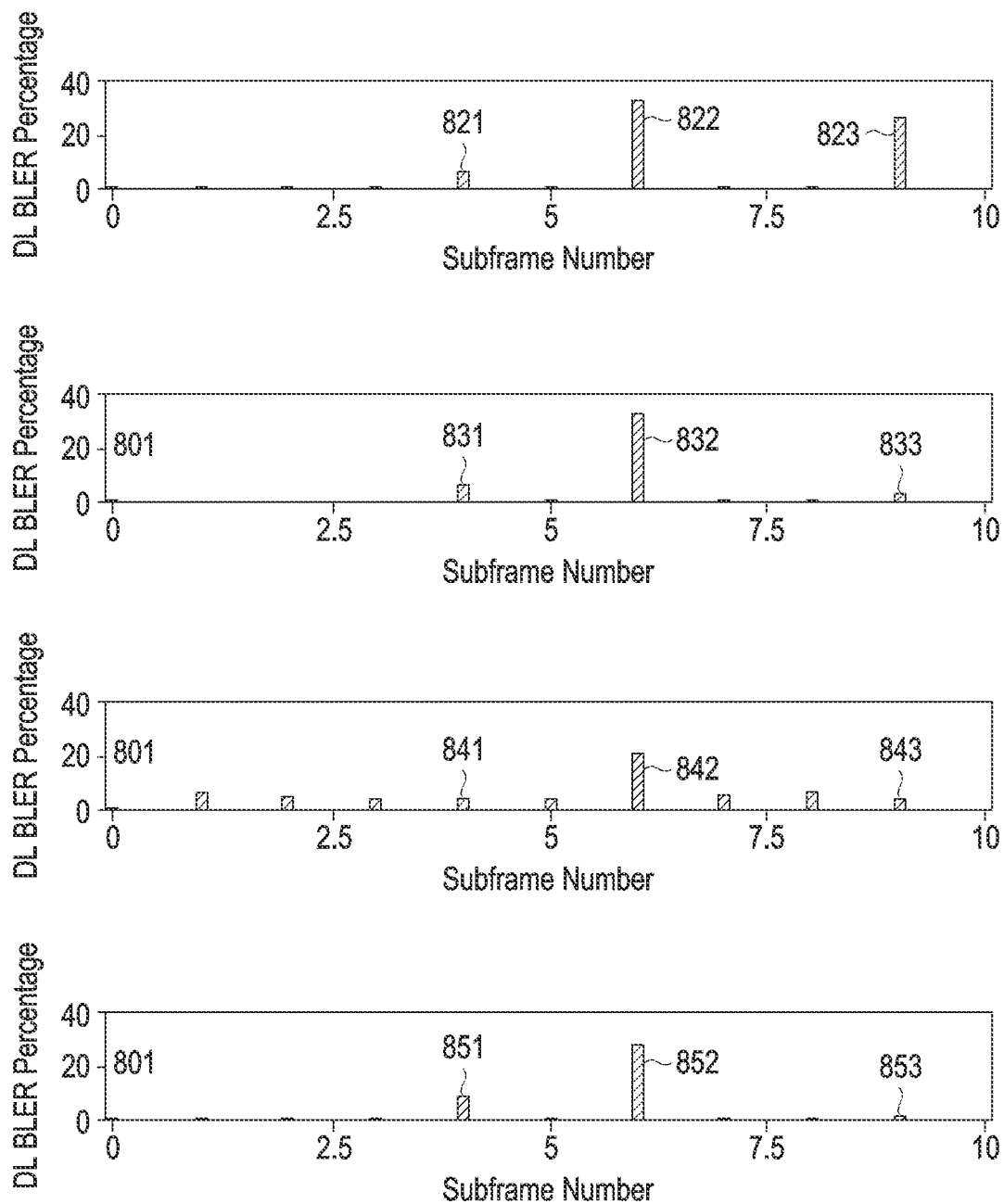

FIGS. 8A and 8B illustrate block error rates (BLERs) measured in a plurality of frequency bands while SRS transmission is performed according to various embodiments of the disclosure.

Figure 8C:
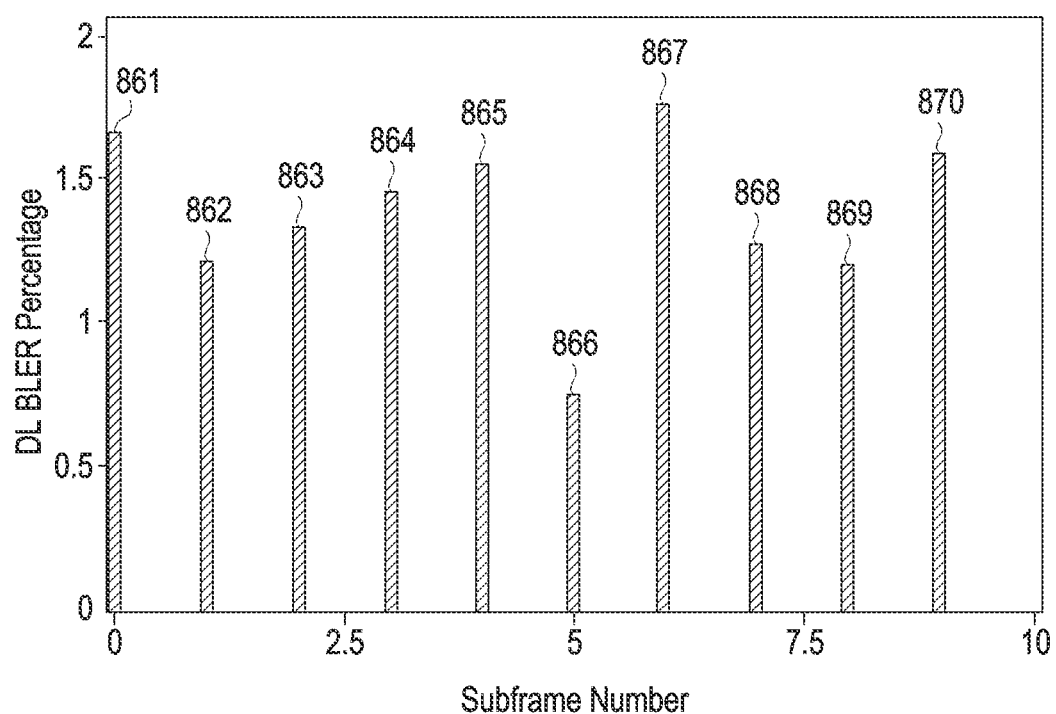
FIGS. 8C and 8D illustrate BLERs measured in a plurality of frequency bands while SRS transmission is stopped according to various embodiments of the disclosure.
Figure 8D:
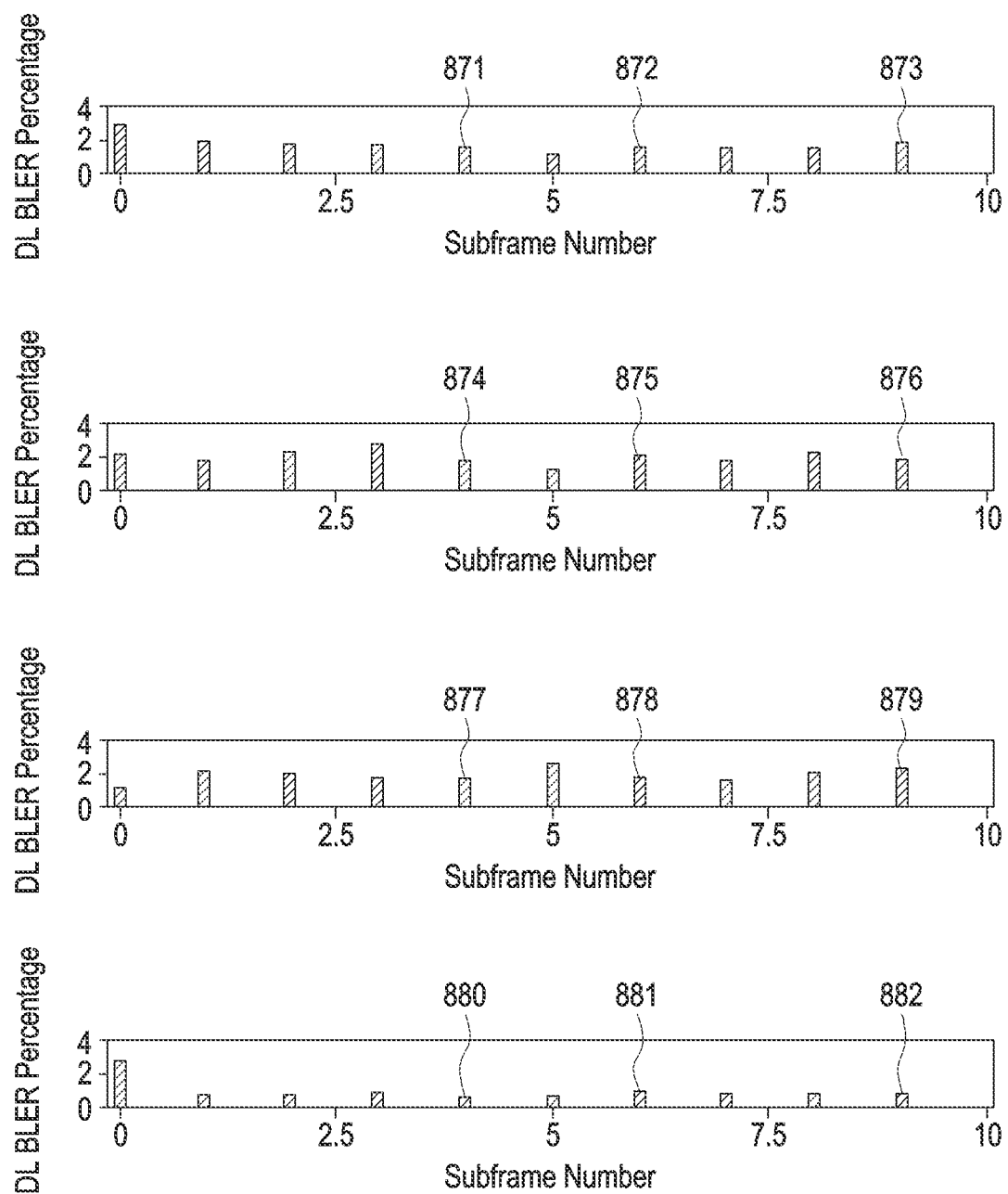

FIGS. 8C and 8D illustrate BLERs measured in a plurality of frequency bands while SRS transmission is stopped according to various embodiments of the disclosure.

Referring to FIG. 7, an electronic device 101 may include a communication processor 710 (e.g., at least one of the first communication processor 212, the second communication processor 214, or the integrated communication processor 260) and an RF circuit 720 (e.g., at least one of the first RFIC 222, the second RFIC 224, the third RFIC 226, or the fourth RFIC 228). The electronic device 101 may include at least one of at least one amplifier 730, 750, and 770, at least one switch 735, 755, and 775, or at least one antenna 741, 742, 743, 744, 761, 762, 763, 764, 781, 782, 783, and 784. For convenience of description, although FIG. 7 illustrates that elements for RF signal transmission are included in the electronic device 101, it will be easily appreciated by one of ordinary skill in the art that elements for receiving and/or processing RF signals may further be included in the electronic device 101.

According to various embodiments, the communication processor 710 may support a plurality of RATs (e.g., LTE communication and NR communication). In the communication processor 710, protocol stacks (e.g., a 3GPP protocol stack for LTE communication and a 3GPP protocol stack for NR communication) for the plurality of RATs may be defined (or stored). The protocol stack may receive a data packet (or Internet protocol (IP) packet) from the application processor (e.g., the processor 120) (or the transmission control protocol (TCP)/IP stack) and process and output it. If the RF signal received from the outside is converted into a baseband signal and received, the protocol stack may process the baseband signal and provide it to the application processor (e.g., the processor 120 (or TCP/IP stack)). The protocol stack may perform an operation for signaling (e.g., control).

According to various embodiments, the RF circuit 720 may process the signal (e.g., a baseband signal) from the communication processor 710 and output an RF signal. At least one amplifier 730, 750, or 770 may amplify and provide the received RF signal. As the at least one amplifier 730, 750, and 770 is controlled, the output power of the RF signal may be adjusted. The SRS of NR communication may be transmitted through each of the first antenna 741, the second antenna 742, the third antenna 743, and the fourth antenna 744. For example, the electronic device 101 may support 1T4R. The first antenna 741 may be an antenna capable of performing both transmission and reception, and the second antenna 742, the third antenna 743, and the fourth antenna 744 may be antennas for reception. The communication processor 710 may identify SRS transmission power and may control the amplifier 730 so that the identified SRS transmission power is applied to the port for each antenna. The switch 735 may selectively connect the RF circuit 720 and the antenna so that the RF signal is applied to a designated antenna. For example, the connection state of the switch 735 may be controlled so that the SRS is sequentially applied through each of the antennas 741, 742, 743, and 744. For example, in the example of FIG. 7, the SRS is shown as transmitted in the n78 frequency band, but the frequency band is not limited thereto. It will be easily appreciated by one of ordinary skill in the art that the number of antennas 741, 742, 743, and 744 for NR communication is exemplary and is not limited thereto. 1T4R is merely an example. The electronic device 101 may support 1T2R, 2T4R, or other capabilities, and it will be easily appreciated by one of ordinary skill in the art that the number of antennas, the number of amplifiers, and/or the connection relationship between the antennas is not limited to a specific one.

According to various embodiments, the electronic device 101 may support carrier aggregation (CA) for LTE. For example, in the embodiment of FIG. 7, the frequency band of B7 associated with the primary cell (PCell) may be selected, and at least one frequency band (not shown) associated with the secondary cell (SCell) may be selected. The number of component carriers (CCs) for CA is not limited to a specific one. However, depending on hardware (HW) restrictions and the frequency band operated by the operator, 2 or more and 32 or less CCs may be typically operated. The signal associated with the PCell may be transmitted/received via at least one of the antennas 761, 762, 763, and 764 via the amplifier 750 and/or the switch 755. The signal associated with the S Cell may be transmitted/received via at least one of the antennas 781, 782, 783, and 784, via the amplifier 770 and/or the switch 775. The number of antennas 761, 762, 763, and 764 and the number of antennas 781, 782, 783, and 784 are exemplary. According to various embodiments, a plurality of frequency bands may correspond to one antenna. For example, the antennas 761, 762, 763, and 764 may correspond not only to ultrahigh bands (e.g., frequency bands 78 and 79) but also to high bands (e.g., frequency bands 7, 38, 39, 40, and 41). Accordingly, it will be easily appreciated by one of ordinary skill in the art that the number of antennas may be smaller than that of FIG. 7.

According to various embodiments, the electronic device 101 may transmit an SRS based on the first RAT (e.g., NR communication). For example, the electronic device 101 may report the UE capability of 1T4R to the network and may receive an SRS configuration from the network. The electronic device 101 may identify times of transmission of four SRSs for transmitting the SRS based on the SRS configuration. The SRS transmission time may be referred to as an SRS slot. The electronic device 101 may control the amplifier 730 and/or the switch 735 to transmit the first SRS through the first antenna 741 during the first SRS slot, the second SRS through the second antenna 742 during the second SRS slot, the third SRS through the third antenna 743 during the third SRS slot, and the fourth SRS through the fourth antenna 744 during the fourth SRS slot. The electronic device 101 may receive downlink data based on the second RAT (e.g., LTE). The electronic device 101 may receive downlink data through, e.g., at least some of the antennas 761, 762, 763, 764, 781, 782, 783, and 784. However, the RF path for SRS transmission for the first RAT may not be completely isolated from the RF path for downlink data reception for the second RAT. In this case, noise may occur in the RF path for receiving downlink data for the second RAT. Or, a harmonic component corresponding to SRS transmission may occur, and noise may be caused in the RF path due to the harmonic component. Accordingly, the BLER corresponding to the downlink frequency band may increase.

In the embodiment of FIG. 7, the case in which the electronic device 101 performs CA for any one RAT (e.g., LTE) has been described. However, it is exemplary, and various embodiments of the disclosure may also be applied even when any one RAT does not perform CA.

For example, FIG. 8A illustrates BLERs 801 to 810 for each subframe in the frequency band (e.g., B7) of the PCell of the second RAT (e.g., LTE).

Referring to FIG. 8A, the electronic device 101 may transmit the first SRS in the SRS slot of the first RAT (e.g., NR communication) corresponding to the fourth subframe of the second RAT (e.g., LTE), the second SRS in the SRS slot of the first RAT (e.g., NR communication) corresponding to the 7th subframe of the second RAT (e.g., LTE), the third SRS in the SRS slot of the first RAT (e.g., NR communication) corresponding to the 8th subframe of the second RAT (e.g., LTE), and the fourth SRS in the SRS slot of the first RAT (e.g., NR communication) corresponding to the 9th subframe of the second RAT (e.g., LTE). The BLER 805 corresponding to the fourth subframe, the BLER 807 corresponding to the sixth subframe, and the BLER 810 corresponding to the ninth subframe may be measured to be relatively high.

FIG. 8B illustrates the BLERs of the frequency bands of four SCells based on CA of 5CC.

Referring to FIG. 8B, it may be identified that the BLER 821 corresponding to the fourth subframe in the first SCell frequency band, the BLER 822 corresponding to the sixth subframe, and the BLER 823 corresponding to the ninth subframe are relatively large. It may be identified that the BLER 831 corresponding to the fourth subframe in the second SCell frequency band, the BLER 832 corresponding to the sixth subframe, and the BLER 833 corresponding to the ninth subframe are relatively large. It may be identified that the BLER 841 corresponding to the fourth subframe in the third SCell frequency band, the BLER 842 corresponding to the sixth subframe, and the BLER 843 corresponding to the ninth subframe are relatively large. It may be identified that the BLER 851 corresponding to the fourth subframe in the fourth SCell frequency band, the BLER 852 corresponding to the sixth subframe, and the BLER 853 corresponding to the ninth subframe are relatively large. This may be due to the fact that the RF path for the first SRS, the RF path for the second SRS, and the RF path for the fourth SRS are not completely isolated from the RF path corresponding to the PCell.

FIG. 8C illustrates BLERs 861 to 870 for each subframe in the frequency band (e.g., B7) of the PCell of the second RAT (e.g., LTE) when no SRS is transmitted in the same environment.

Referring to FIG. 8C, it may be identified that the BLER 865 corresponding to the fourth subframe, the BLER 867 corresponding to the sixth subframe, and the BLER 870 corresponding to the ninth subframe are reduced as compared to the case of FIG. 8A.

Referring to FIG. 8D, the BLERs of frequency bands of four SCells based on CA of 5CC when no SRS is transmitted are shown. It may be identified that the BLER 871 corresponding to the fourth subframe in the first SCell frequency band, the BLER 872 corresponding to the sixth subframe, and the BLER 873 corresponding to the ninth subframe are relatively reduced as compared with FIG. 8B. It may be identified that the BLER 874 corresponding to the fourth subframe in the second SCell frequency band, the BLER 875 corresponding to the sixth subframe, and the BLER 876 corresponding to the ninth subframe are relatively reduced as compared with FIG. 8B. It may be identified that the BLER 877 corresponding to the fourth subframe in the third SCell frequency band, the BLER 878 corresponding to the sixth subframe, and the BLER 879 corresponding to the ninth subframe are relatively reduced as compared with FIG. 8B. It may be identified that the BLER 880 corresponding to the fourth subframe in the fourth SCell frequency band, the BLER 881 corresponding to the sixth subframe, and the BLER 882 corresponding to the ninth subframe are relatively reduced as compared with FIG. 8B. As a result of comparison between FIGS. 8A and 8B and between FIGS. 8C and 8D, it may be identified that the high BLERs in some subframes in FIGS. 8A and 8B are attributed to SRS transmission.

According to various embodiments, when the BLER meets a designated condition, the electronic device 101 may perform a restriction operation on the corresponding SRS. For example, in FIGS. 8A and 8B, when the BLERs in the fourth subframe and the ninth subframe of the second RAT (e.g., LTE) meets a designated condition, restriction operations corresponding to the first SRS corresponding to the fourth subframe and the fourth SRS corresponding to the ninth subframe may be performed. Alternatively, the electronic device 101 may perform a restriction operation corresponding to all the SRSs. According to various embodiments, restriction operations are described below. As the SRS restriction operation is performed, the BLER may be reduced and the overall data throughput may be prevented from being reduced.

Figure 9:
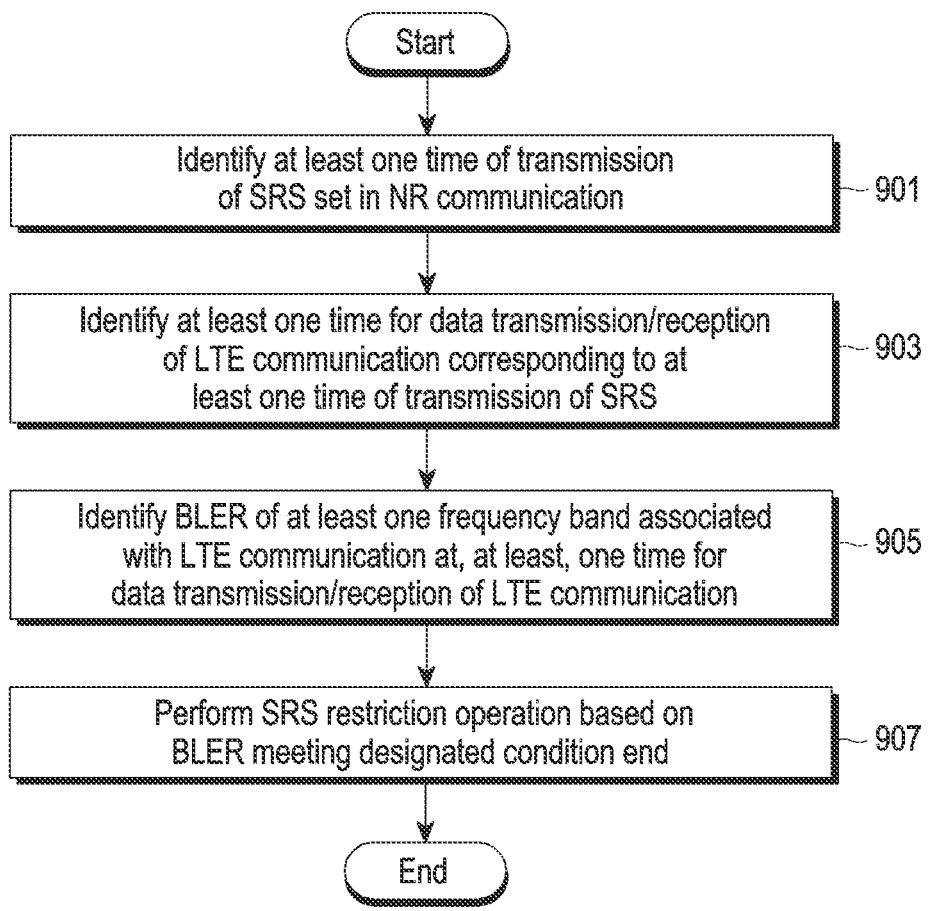
FIG. 9 is a flowchart illustrating an operation method of an electronic device according to an embodiment of the disclosure.

FIG. 9 is a flowchart illustrating an operation method of an electronic device according to an embodiment of the disclosure.

According to various embodiments, an electronic device 101 (e.g., at least one of the processor 120, the first communication processor 212, the second communication processor 214, or the integrated communication processor 260) may identify at least one time (e.g., at least one time point) of transmission of the SRS configured in NR communication in operation 901.

Referring to FIG. 9, the electronic device 101 may use EN-DC based on LTE communication and NR communication, but as described above, the type of DC is not limited. The electronic device 101 may identify at least one time of transmission (e.g., at least one SRS slot) of SRS based on the SRS configuration received from the network.

According to various embodiments, the electronic device 101 may identify at least one time (e.g., at least one of the time of reception or the time of transmission) for data transmission/reception of LTE communication corresponding to at least one time of transmission of the SRS, in operation 903. For example, the electronic device 101 may identify at least one time of reception of LTE communication corresponding to at least one time of transmission of the SRS using a real time clock (RTC) defined therein. In one example, the electronic device 101 may identify the first time of the RTC corresponding to the synchronization channel of the NR communication. The electronic device 101 may identify a difference between the time of NR communication and the time of LTE communication by identifying the synchronization channel of LTE communication corresponding to the first time of RTC. The electronic device 101 may identify at least one time of reception of LTE communication corresponding to at least one time of transmission of SRS using the identified difference. As another example, the electronic device 101 may identify at least one time of RTC corresponding to at least one time of transmission of the SRS. The electronic device 101 may identify at least one time (e.g., a subframe (or slot)) of LTE communication corresponding to at least one time of the RTC. Meanwhile, the scheme for identifying the time of LTE communication corresponding to the above-described time of transmission of SRS is not limited.

According to various embodiments, in operation 905, the electronic device 101 may identify the BLER of at least one frequency band associated with LTE communication at, at least, one time for data transmission/reception of LTE communication. For example, referring to FIG. 8A, the electronic device 101 may identify a fourth subframe, a sixth subframe, an eighth subframe, and a ninth subframe of LTE communication corresponding to four SRS slots corresponding to four SRSs. The electronic device 101 may identify the BLERs in the fourth subframe, the sixth subframe, the eighth subframe, and the ninth subframe of LTE communication. If CA is being performed in LTE communication, the electronic device 101 may identify the BLERs in the frequency band corresponding to the PCell and at least one frequency band corresponding to the Scell. The electronic device 101 may be configured to identify the BLER for all the frequency bands but, in another example, the electronic device 101 may be configured to identify the BLER for some of all the frequency bands.

According to various embodiments, in operation 907, the electronic device 101 may perform an SRS restriction operation based on the BLER meeting a designated condition. The designated condition may be when the BLER is greater than or equal to a threshold (e.g., 50%) at which data throughput may be determined to be degraded, but is not limited thereto. If the BLER is measured for a plurality of frequency bands, a threshold corresponding to the PCell and a threshold corresponding to the SCell may be set to differ from each other. The electronic device 101 may perform the SRS restriction operation, e.g., when the BLER in any one of the plurality of frequency bands is equal to or greater than a threshold. Alternatively, the electronic device 101 may perform the SRS restriction operation when the number of frequency bands, in which the BLER is equal to or greater than the threshold, among the plurality of frequency bands is equal to or greater than a threshold number. Alternatively, the electronic device 101 may determine whether to perform the SRS restriction operation based on whether the sum (or weighted sum) or average of the BLER in a specific subframe in the PCell and the BLER in a specific subframe in the SCell meets a designated condition. It will be easily appreciated by one of ordinary skill in the art that the above-described designated condition of BLER is not limited as long as it is a condition indicating that data throughput is reduced due to SRS transmission. It will be easily appreciated by one of ordinary skill in the art that other indicators (e.g., modulation and coding scheme (MCS) or channel quality information (CQI)) indicating the quality of downlink, other than BLER, may be used instead of and/or in addition to the BLER according to various embodiments of the disclosure.

According to various embodiments, the electronic device 101 may also determine whether to perform an SRS restriction operation based on a result of comparison between the BLER in the subframe of LTE communication when no SRS is not transmitted and the BLER in the subframe when an SRS is transmitted. For example, in the example of FIG. 7A, subframes of LTE communication corresponding to SRS slots of NR communication are a fourth subframe, a sixth subframe, an eighth subframe, and a ninth subframe. The electronic device 101 may identify the BLER of the subframe (e.g., the third subframe) when no SRS is transmitted. The electronic device 101 may determine whether to perform an SRS restriction operation based on the result of comparison between the two BLERs. If the difference between the two BLERs is equal to or greater than a threshold difference, the electronic device 101 may perform an SRS restriction operation. Alternatively, if the ratio between the two BLERs is equal to or greater than a threshold ratio, the electronic device 101 may perform an SRS restriction operation. The electronic device 101 may set, as a reference, the BLER of the subframe before or after the subframe where an SRS is transmitted, but this is exemplary. Any BLER of the subframe where no SRS is not transmitted may be used as a reference without limitation. Alternatively, the electronic device 101 may set an average or an intermediate value of the BLERs of a plurality of subframes where no SRS is transmitted, as a reference, and the reference is not limited to a specific one.

According to various embodiments, when a condition designated for the BLER in a specific subframe is met, the electronic device 101 may perform an SRS restriction operation immediately in response thereto. In another embodiment, the electronic device 101 may also be configured to perform an SRS restriction operation if it is identified that the number of times in which the designated condition is met during a predetermined period (e.g., 10 radio frames) is equal to or greater than a threshold number, or occasions of meeting the designated condition continuously occur (e.g., three consecutive times).

The identification of the BLER when an SRS is transmitted and whether the designated condition is met as described above may be performed, e.g., by the L1 layer, but is not limited as performed by a specific entity. The L1 layer may perform, e.g., identification of the subframe of LTE communication corresponding to the SRS slot of NR communication, identification of the BLER in the identified subframe, and/or identification of whether the identified BLER meets a designated condition.

According to various embodiments, SRS restriction operations may include at least one of adjusting the transmission power of the SRS, adjusting the port of the SRS, or stopping the SRS, which are described below.

Figure 10:
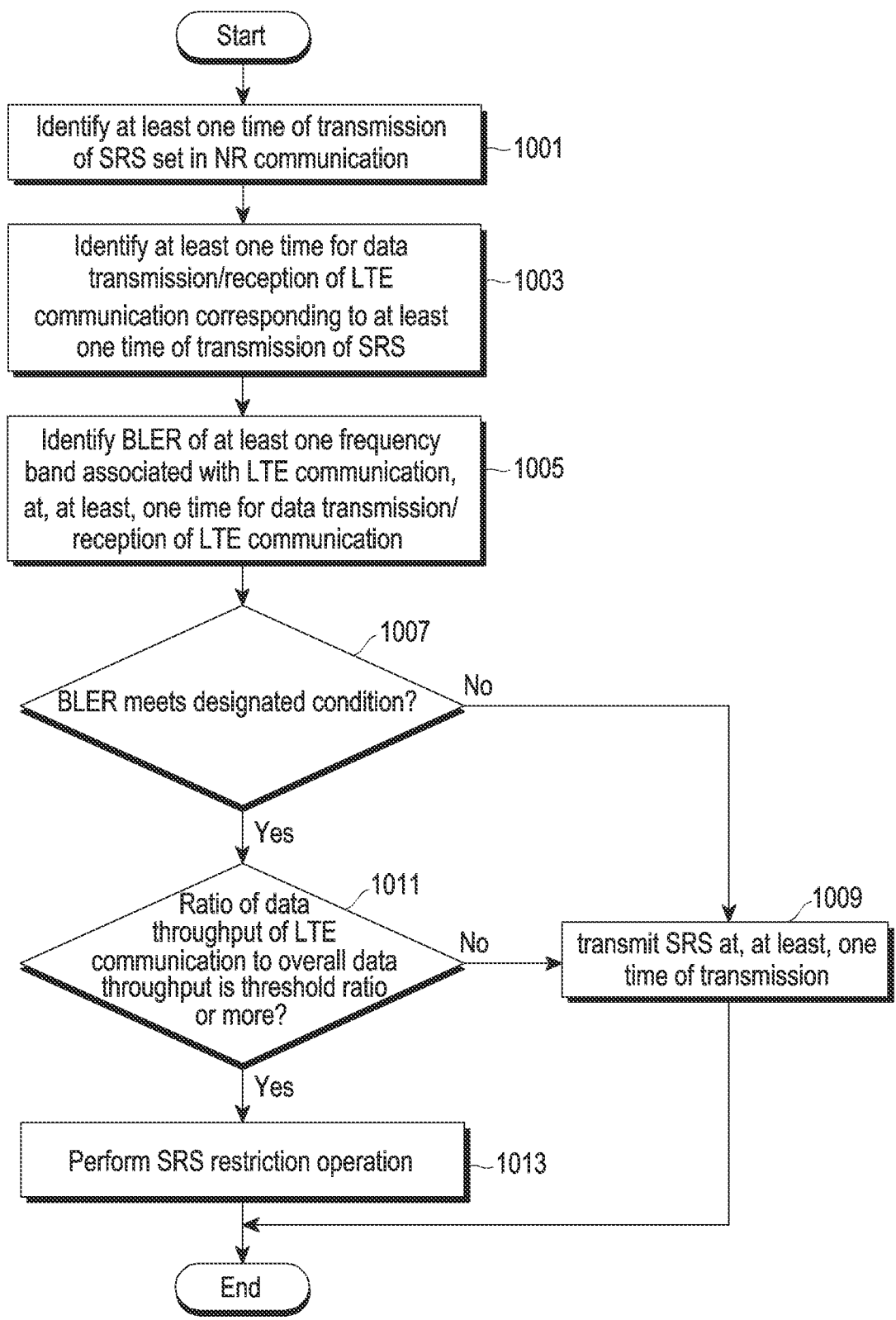
FIG. 10 is a flowchart illustrating an operation method of an electronic device according to an embodiment of the disclosure.

FIG. 10 is a flowchart illustrating an operation method of an electronic device according to an embodiment of the disclosure.

According to various embodiments, an electronic device 101 (e.g., at least one of the processor 120, the first communication processor 212, the second communication processor 214, or the integrated communication processor 260) may identify at least one time of transmission of the SRS configured in NR communication in operation 1001. In operation 1003, the electronic device 101 may identify at least one time (e.g., a time of reception and/or time of transmission of LTE communication) for data transmission/reception of LTE communication corresponding to at least one time of transmission of the SRS. In operation 1005, the electronic device 101 may identify the BLER of at least one frequency band associated with LTE communication at, at least, one time for data transmission/reception of LTE communication. In operation 1007, the electronic device 101 may determine whether the BLER meets a designated condition. For example, with reference to FIG. 9, the electronic device 101 may determine whether the BLER meets the designated condition based on various schemes. If the BLER does not meet the designated condition (No in 1007), in operation 1009, the electronic device 101 may transmit the SRS at, at least, one time of transmission. For example, the electronic device 101 may transmit an SRS at, at least, one time of transmission identified based on the SRS configuration. SRS transmission power may be determined, e.g., as defined in 3GPP TS 38.213, which is described below.

If the BLER meets the designated condition (Yes in 1007), according to various embodiments, the electronic device 101 may determine whether the ratio of the data throughput of LTE communication to the overall data throughput is equal to or greater than a threshold ratio in operation 1011. In one example, the electronic device 101 may identify the theoretical data throughput corresponding to each of the currently used frequency bands (e.g., at least one frequency band of NR communication and at least one frequency band of LTE communication). Unless the ratio of the data throughput of LTE communication to the overall data throughput is equal to or greater than the threshold ratio (No in 1011), the electronic device 101 may transmit an SRS without an SRS restriction operation in operation 1009. If the ratio of the data throughput of LTE communication to the overall data throughput is equal to or greater than the threshold ratio (Yes in 1011), the electronic device 101 may perform an SRS restriction operation in operation 1013. Even when a high BLER occurs in LTE communication according to SRS transmission in NR communication, if the proportion of the data throughput of LTE communication is not large, an SRS restriction operation may rather cause a decrease in the overall data throughput. Accordingly, according to various embodiments, the electronic device 101 may be configured to perform an SRS restriction operation when the ratio of the data throughput of LTE communication to the overall data throughput is equal to or greater than the threshold ratio.

According to various embodiments, the electronic device 101 may identify the theoretical data throughput of NR communication based on Equation 1.

$$\text{data rate(in } Mbps) = \sum_{j=1}^{J} \left( v_{Layers}^{(j)} \cdot Q_m^{(j)} \cdot f^{(j)} \cdot R_{max} \cdot BW^{(j)} \cdot S_u^{(j)} \cdot (1 - OH^{(j)}) \right) \quad \text{Equation 1}$$

In Equation 1, J may be the number of CCs. Equation 1 may represent the sum of per-CC data throughputs. $v_{Layers}^{(j)}$ may be the maximum number of layers, $Q_m^{(j)}$ may be the maximum value of the modulation order, $f^{(j)}$ may be the scaling factor, $R_{max}$ may be a fixed value (e.g., 948/1024=0.926), $BW^{(j)}$ may be the bandwidth, $S_u^{(j)}$ may be spectral utilization, and $OH^{(j)}$ may be overhead. Each parameter, e.g., Equation 1, may be based on 3GPP TS 38.306 dp, but is not limited thereto. The electronic device 101 may identify the theoretical data throughput in the frequency band of NR communication, e.g., as defined in 3GPP TS 38.331. For example, the electronic device 101 may set the periodicity of the DL slot and the UL slot considering TDD-UL-DL-ConfigCommon in the received RRC reconfiguration message. For example, when the SCS is 30 kHz and the RB is 273, it is assumed that the electronic device 101 identifies a theoretical data throughput of 584.25 Mbps based on, e.g., Equation 1. In TDD, in the case of nrof-DownlinkSlots(3) and nrofUplinkSlots(1), the slot periodicity may be DDDSU. Accordingly, when the overall bandwidth is, e.g., 100 Mhz, the downlink dedicated bandwidth may be 60 Mhz, which is 60% of the overall bandwidth. Here, 10 out of 14 symbols in S may be used as a downlink. In this case, the theoretical data throughput may be 434.014 Mbps as a value obtained by multiplying 584.25 Mbs based on Equation 1 by $(0.6+0.2*(10/14))$. 0.6 may correspond to DDD among DDDSU, 0.2 may correspond to S, and $10/14$ may mean a ratio of downlink symbols to all the symbols in S.

the identified theoretical data throughput as 400 Mbps, rather than 300 Mbps. The electronic device 101 may identify the theoretical data throughput for the SCell in the same manner. The electronic device 101 may identify the layer when adding CA of the SCell of LTE communication. For example, when referring to ScellIndex-r10 1, it is antennaPortsCount an4 and, when referring to ScellIndex-r10 2, it is antennaPortsCount an2. Based on this, it may be identified that SCC1 is operated in 4×4 MIMO and SCC2 is operated in 2×2 MIMO. Further, the bandwidth of the SCell may be identified based on "dl-Bandwidth-r10" of the RRC reconfiguration message and, based thereupon, the theoretical data throughput of the SCell of LTE communication may be calculated. For example, with 75 RBs in the case of 4×4 MIMO and 256 QAM, a theoretical data throughput of 300 Mbps may be calculated.

Tables 1 and 2 are examples of the theoretical data throughput and actual data throughput when 3CC CA in LTE communication and EN-DC of NR communication are in use. Tables 1 and 2 may be the results of measurement by different operators.

TABLE 1

| RAT | CC | Frequency band (Bandwidth) | Center frequency (MHz) | TP (Mbps) when SRS is transmitted | TP when no SRS is transmitted | Theoretical TP |
|---|---|---|---|---|---|---|
| LTE | PCell | B3 (20 Mhz) | 1385 | 183 | 279 | 400 |
| LTE | SCell-1 | B7 (20 Mhz) | 3150 | 194 | 293 | 400 |
| LTE | SCell-2 | B7 (20 Mhz) | 2850 | 94 | 172 | 200 |
| NR | — | N78 (20 Mhz) | 626722 | 250 | 235 | 580 |
| | | Sum | | 721 | 979 | 1590 |

TABLE 2

| RAT | CC | Frequency band (Bandwidth) | Center frequency (MHz) | TP (Mbps) when SRS is transmitted | TP when no SRS is transmitted | Theoretical TP |
|---|---|---|---|---|---|---|
| LTE | PCell | B7 (20 Mhz) | 3350 | 113 | 174 | 200 |
| LTE | SCell-1 | B3 (10 Mhz) | 1651 | 53 | 76 | 100 |
| LTE | SCell-2 | B1 (10 Mhz) | 102 | 62 | 135 | 200 |
| NR | — | N78 (30 Mhz) | 626722 | 506 | 471 | 860 |
| | | Sum | | 734 | 856 | 1360 |

According to various embodiments, the electronic device 101 may identify the theoretical data throughputs of PCell and SCell of LTE communication. The electronic device 101 may identify the theoretical data throughput based on, e.g., the TBS index and $N_{PRB}$. For example, the electronic device 101 may store data throughput information for each $N_{PRB}$ and TBS index of 3GPP TS 36.213 (e.g., 7.1.7.2.1-1 of 3 GPPP TS 36.213: transport block size table) and identify the data throughput corresponding to the identified information. The electronic device 101 may also identify the TBS index based on the MCS index and the modulation order. The electronic device 101 may identify the theoretical data throughput based on the identified data throughput, layer, and MCS. For example, it is assumed that the PCell supports 4×4 MIMO and 256QAM. The electronic device 101 may identify the data throughput as 75376 kbps based on data throughput information (e.g., 7.1.7.2.1-1 of 3 GPPP TS 36.213: transport block size table). Based on 4×4 MIMO, the electronic device 101 may identify the theoretical data throughput as 4 times 75376 kbps or about 300 Mbps. If 256QAM is applied, the electronic device 101 may identify In the example of Table 1, the ratio of data throughput (e.g., 400+400+200=1000 Mbps) by LTE communication to the total data throughput (e.g., 1590 Mbps) may be 63.29%. Further, a reduction rate of the overall data throughput (e.g., 721 Mbps) when an SRS is transmitted, relative to the overall data throughput (e.g., 979 Mbps) when no SRS is transmitted, may be 26.35%. In the example of Table 2, the ratio of data throughput (e.g., 200+100+200=600 Mbps) by LTE communication to the total data throughput (e.g., 1360 Mbps) may be 36.76%. Further, a reduction rate of the overall data throughput (e.g., 734 Mbps) when an SRS is transmitted, relative to the overall data throughput (e.g., 856 Mbps) when no SRS is transmitted, may be 14.25%. It may be identified that when the proportion of the data throughput of LTE communication is relatively high, the reduction of the overall data throughput is relatively high. Accordingly, the electronic device 101 may be configured to perform an SRS restriction operation when the ratio of the data throughput of the remaining RATs other than the transmission RATs of the SRS, relative to the total data throughput is equal to or greater than a threshold ratio (e.g., 30%), The threshold ratio may be a fixed value or an adjustable value. The above-described identification of the ratio of data throughput of LTE communication to the overall data throughput may be performed, e.g., by the L3 layer, but is not limited as performed by a specific entity. The L3 layer may identify the data throughput for each RAT based on information obtained from the RRC message and/or information obtained from the L1 layer. When it is identified that the BLER in operation 1007 meets the designated condition, the L1 layer may obtain the data throughput for each RAT (or the ratio of the LTE communication data throughput to the overall data throughput) from the L3 layer and may perform operation 1011. In another embodiment, the electronic device 101 may determine whether to perform an SRS restriction operation using an actual data throughput instead of the theoretical data throughput.

Figure 11:
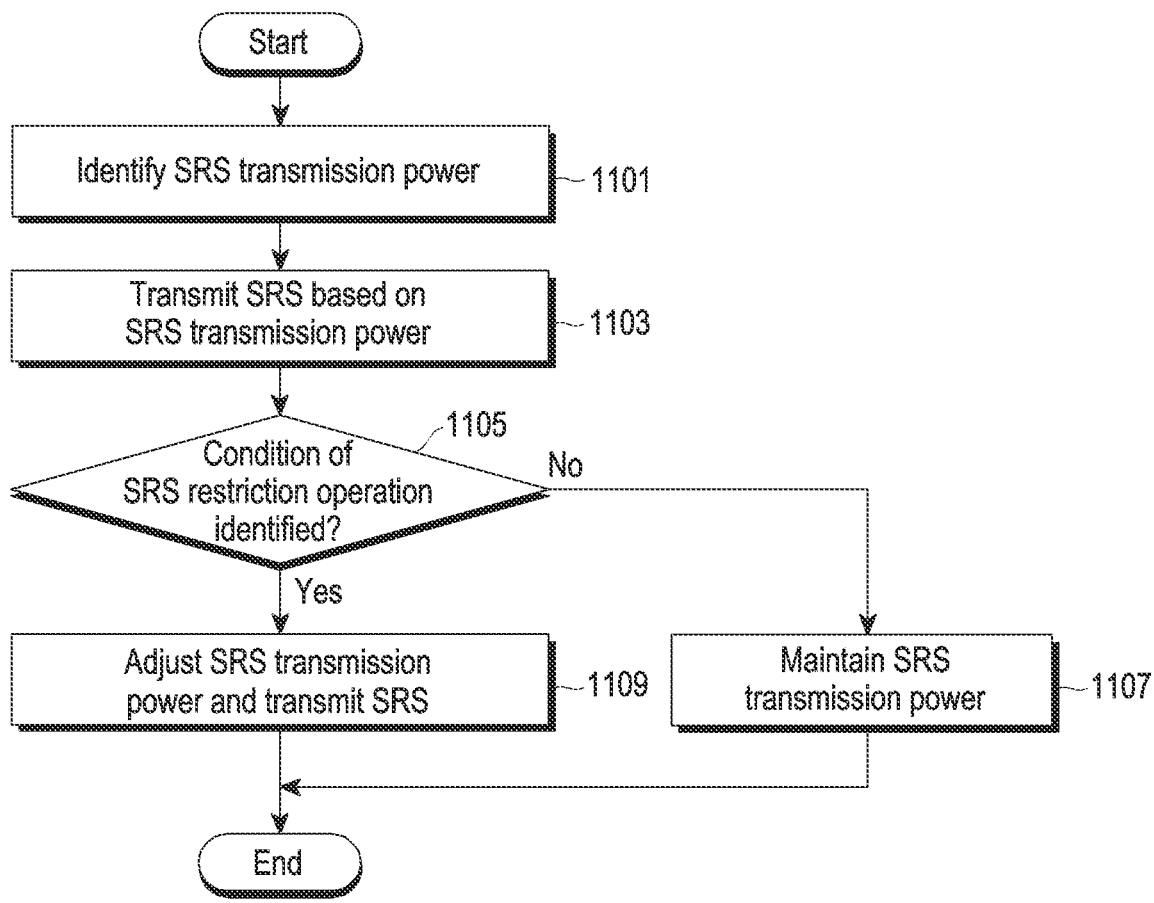
FIG. 11 is a flowchart illustrating an operation method of an electronic device according to an embodiment of the disclosure.

FIG. 11 is a flowchart illustrating an operation method of an electronic device according to an embodiment of the disclosure.

The embodiment of FIG. 11 is described with reference to FIG. 12.

Figure 12:
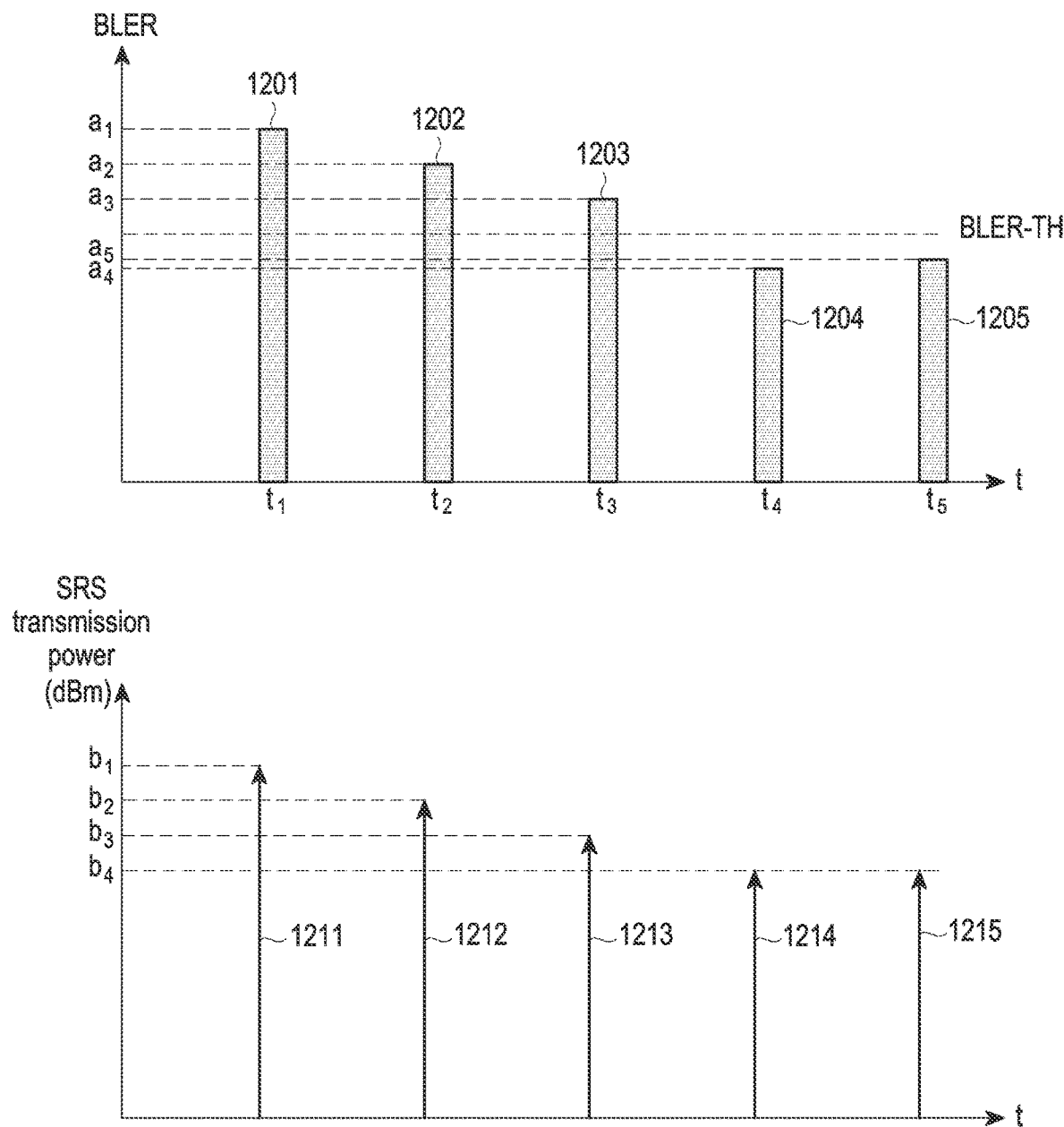
FIG. 12 illustrates a BLER and SRS transmission power of LTE, according to an embodiment of the disclosure.

FIG. 12 illustrates a BLER and SRS transmission power of LTE communication, according to an embodiment of the disclosure.

According to various embodiments, an electronic device 101 (e.g., at least one of the processor 120, the first communication processor 212, the second communication processor 214, or the integrated communication processor 260) may identify SRS transmission power in operation 1101. In operation 1103, the electronic device 101 may transmit an SRS based on the identified SRS transmission power. The electronic device 101 may determine the transmission power of the SRS based on SRS target power and/or the maximum power (e.g., UE Tx MAX power) of the electronic device 101. The electronic device 101 may determine the SRS target power (or SRS output power) based on Equation 2 according to, e.g., 3GPP TS 38.213.

$$P_{O\_SRS,b,f,c}(q_s) + 10 \log_{10}(2^\mu \cdot M_{SRS,b,f,c}(i)) + \alpha_{SRS,b,f,c}(q_s) \cdot PL_{b,f,c}(q_d) + h_{b,f,c}(i,l)$$ Equation 2

The definition of Equation 1 may follow 3GPP TS 38.213. For example, $P_{O\_SRS,b,f,c(qs)}$ may be provided by p0 for the activation uplink bandwidth part (UL BWP)(b) of the serving cell c and the SRS resource set (qs) provided by the SRS-ResourceSetID and the SRS-ResourceSet according to the SRS configuration. $M_{SRS,b,f,c}(i)$ is the SRS bandwidth expressed as the numbers of resource blocks for the SRS transmission occasion (i) on the activation UL BWP(b) of the carrier f of the serving cell c, and μ is the SCS. $\alpha_{SRS,b,f,c}(q_s)$ is provided by alpha for the activation UL BWP of the carrier f of the serving cell c and the SRS resource set $q_s$. $PL_{b,f,c}(q_d)$ is the downlink pathloss predicted in dB by the user equipment (UE) using the RS resource index $q_d$ for the activation downlink BWP (DL BWP) of the serving cell c and the SRS resource set $q_s$. $h_{b,f,c}(i, 1)$ may be $\delta_{SRS,b,f,c}(i, 1)$ and, for the condition, may follow 3GPP TS 38.213, and it is a value that may be adjusted by downlink control information (DCI) from the base station. The maximum power of the electronic device 101 may be determined as the minimum value of the maximum available transmission power PcMax of the electronic device 101 considering the characteristics of the electronic device 101, the maximum transmission power PeMax according to the power class set in the electronic device 101, and the maximum transmission power (SAR Max Power) considering the specific absorption rate (SAR) backoff event, but the scheme of determination is not limited to a specific one. In one example, the maximum power for SRS may be set to be larger than the common UE TX Max Power. The electronic device 101 may determine, e.g., the lower value of the SRS target power and the maximum power as the SRS transmission power. The electronic device 101 may be installed inside or outside the RFFE to control the power amplifier to transmit an SRS with the SRS transmission power. In various embodiments, transmitting the SRS in a specific size may mean controlling at least one amplifier in the electronic device 101 so that power (e.g., in dBm) corresponding to the specific size is provided to the antenna.

According to various embodiments, the electronic device 101 may determine whether a condition of an SRS restriction operation is identified in operation 1105. For example, referring to FIG. 9, the electronic device 101 may determine whether the BLER in LTE communication meets a designated condition. Referring to FIG. 10, the electronic device 101 may determine whether the BLER in LTE communication meets the designated condition and whether the ratio of the data throughput of LTE communication to the overall data throughput is greater than or equal to a threshold ratio. If the condition of the SRS restriction operation is identified (Yes in 1105), the electronic device 101 may adjust the SRS transmission power and transmit an SRS in operation 1107. The electronic device 101 may determine whether the condition of the SRS restriction operation is identified even after the SRS transmission power is adjusted and may adjust the SRS transmission power until the condition of the SRS restriction operation is not identified. If the condition of the SRS restriction operation is not identified (No in 1105), the electronic device 101 may maintain the SRS transmission power in operation 1109. However, the electronic device 101 may adjust the SRS transmission power according to a change in the SRS target power of 3GPP TS 38.211 (e.g., reception of DCI from the network).

Referring to FIG. 12, the electronic device 101 may transmit the SRSs 1211, 1212, 1213, 1214, and 1215 at a set time using an antenna designated based on a configuration for SRS transmission. For example, it is assumed that the SRSs 1211, 1212, 1213, 1214, and 1215 in FIG. 12 are transmitted through any one designated antenna port. SRSs transmitted through the other antenna ports are omitted for clarity of description. The electronic device 101 may transmit a first SRS 1211 in NR communication at t1. The SRS transmission power of the first SRS 1211 may be b1. At t1, the BLER 1201 in a first frequency band of LTE communication may be a1%, which may be above a threshold BLER (BLER-TH). The electronic device 101 may thus adjust the SRS transmission power. At t2, the electronic device 101 may transmit a second SRS 1212. The SRS transmission power of the second SRS 1212 may be b2. The electronic device 101 may adjust the SRS transmission power using, e.g., a designated adjustment amount (e.g., b2-b1 dB), but the adjustment amount and/or adjustment scheme is not limited to a specific one. For example, the electronic device 101 may determine the adjustment amount of SRS transmission power of NR communication based on the BLER 1202 and BLER 1203 measured in LTE communication. The electronic device 101 may adjust the SRS transmission power up to b4 until a BLER (e.g., BLER 1204) less than the threshold BLER (BLER-TH) is identified. When a fourth SRS 1214 is transmitted, the BLER 1204 below the threshold BLER (BLER-TH) may be identified, and accordingly, the electronic device 101 may maintain the SRS transmission power as b4. The electronic device 101 may transmit a fifth SRS 1215 based on the SRS transmission power of b4. The BLER 1205 in LTE communication while the fifth SRS 1215 is transmitted may be a5. However, it will be easily appreciated by one of ordinary skill in the art that as described above, if the SRS transmission power based on 3GPP TS 38.211 is adjusted, the electronic device 101 may adjust the SRS transmission power even when the BLER 1204 less than the threshold BLER (BLER-TH) is identified.

In various embodiments, the electronic device 101 may adjust the SRS transmission power of a specific port so that the BLER corresponding to the specific port is the same as the BLER corresponding to another port (or to a level having a difference within a threshold range).

Figure 13:
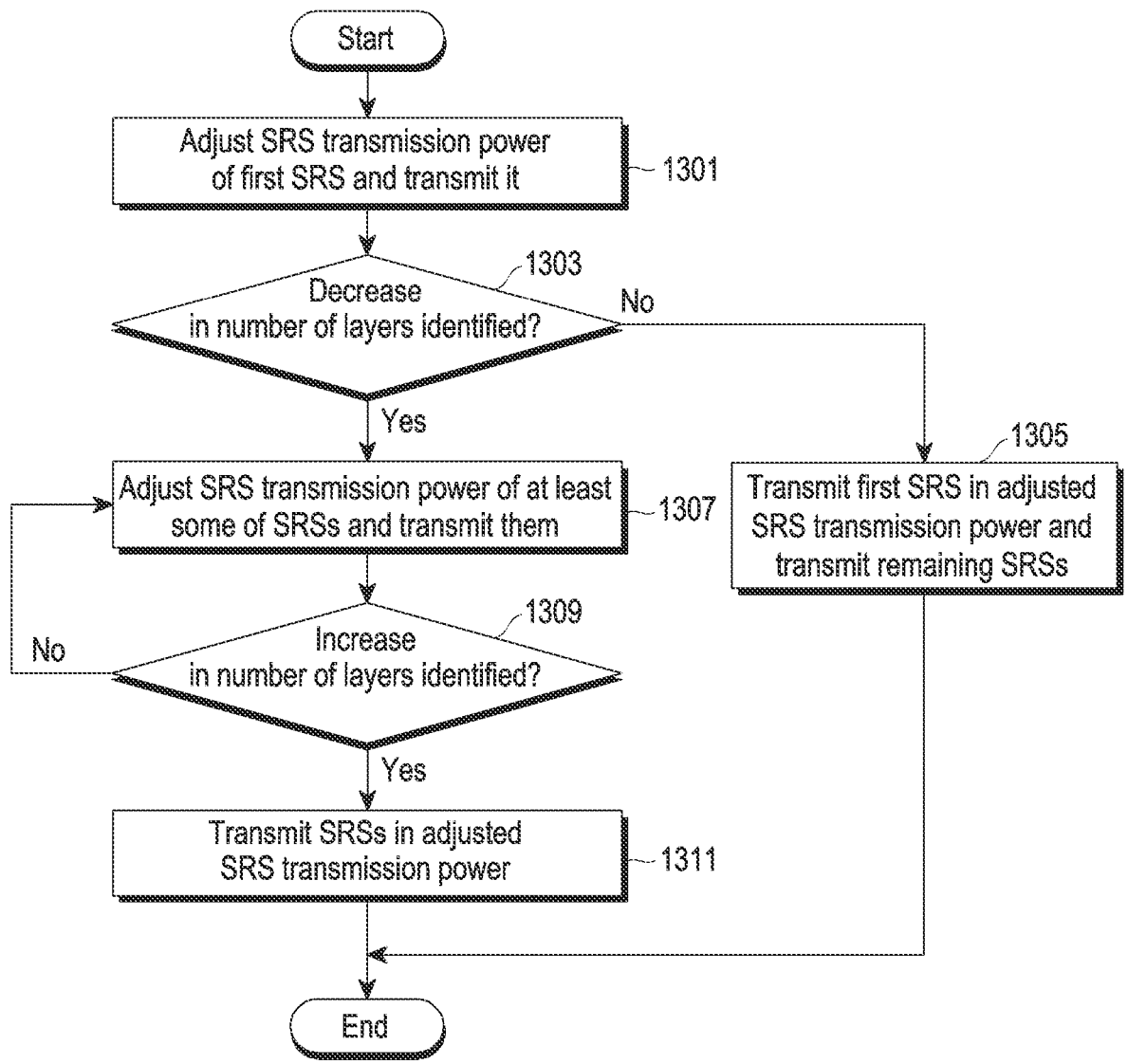
FIG. 13 is a flowchart illustrating an operation method of an electronic device according to an embodiment of the disclosure.

FIG. 13 is a flowchart illustrating an operation method of an electronic device according to an embodiment of the disclosure.

The embodiment of FIG. 13 is described with reference to FIG. 14.

Figure 14:
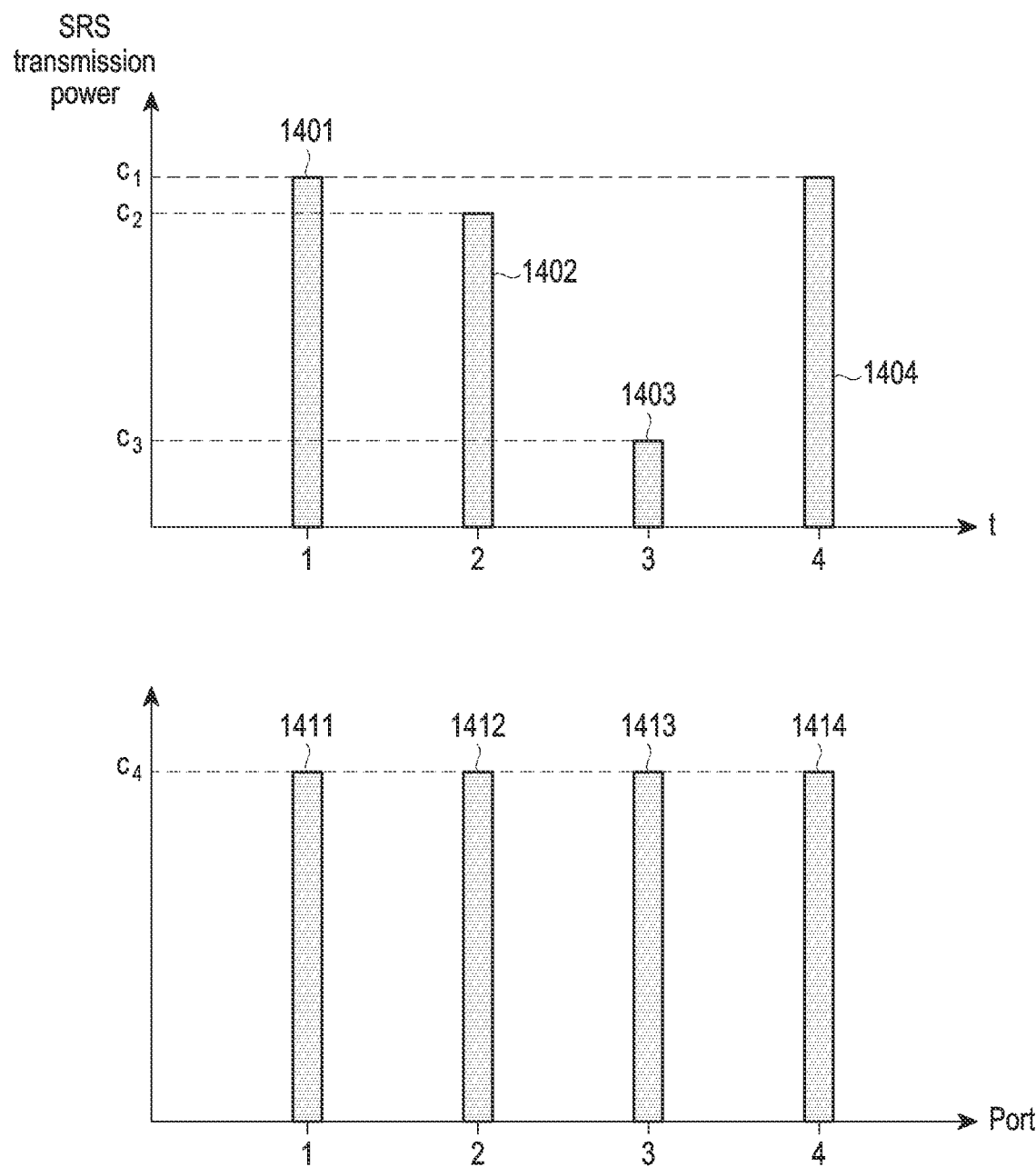
FIG. 14 illustrates a BLER and SRS transmission power of LTE, according to an embodiment of the disclosure.

FIG. 14 illustrates a BLER and SRS transmission power of LTE communication, according to an embodiment of the disclosure.

According to various embodiments, an electronic device 101 (e.g., at least one of the processor 120, the first communication processor 212, the second communication processor 214, or the integrated communication processor 260) may adjust and transmit transmission power in operation 1301. For example, as in operation 1107 of FIG. 11, it is assumed that the condition of the SRS restriction operation is identified and the SRS transmission power is adjusted. In operation 1303, the electronic device 101 may determine whether a reduction in the number of downlink layers configured in at least one specific CC in the LTE or NR network is identified. If no reduction in the number of layers is identified (No in 1303), the electronic device 101 may transmit the first SRS with the adjusted SRS transmission power and the remaining SRSs (e.g., the SRSs corresponding to the remaining ports) with the set transmission power in operation 1305. The SRS transmission power of the remaining SRSs may be determined, e.g., based on 3GPP TS 38.211 if it is not adjusted, or it may be in an adjusted state.

According to various embodiments, if a reduction in the number of downlink layers configured in at least one specific CC in the LTE or NR network is identified (Yes in 1303), the electronic device 101 may adjust and transmit the transmission power of at least some of the SRSs in operation 1307. For example, referring to FIG. 14, the electronic device 101 may transmit a 1-1st SRS 1401 corresponding to a first port with an SRS transmission power of c1, a 2-1st SRS 1402 corresponding to a second port with an SRS transmission power of c2, a 3-1st SRS 1403 corresponding to a third port with an SRS transmission power of c3, and a 4-1st SRS 1404 corresponding to a fourth port with an SRS transmission power of c1. For example, as the BLER of LTE communication corresponding to the third port is identified as greater than or equal to the threshold BLER so that the electronic device 101 adjusts the SRS transmission power corresponding to the third port, the SRS transmission power c3 of the 3-1st SRS 1403 may be set to be smaller than the remaining SRS transmission powers. When the imbalance between the SRS transmission powers is large, there is a possibility of allocating a lower layer to the electronic device 101 in the NR network. It is assumed that the electronic device 101 identifies a reduction in layer as compared with the previous time after transmitting the SRSs 1401, 1402, 1403, and 1404. Thus, the electronic device 101 may determine to adjust the SRS transmission power of the SRSs. In one example, the electronic device 101 may set the SRS transmission powers of the SRSs 1411, 1412, 1413, and 1414 as the same value (e.g., c4), but this is exemplary, and at least some of the per-port SRS transmission powers may differ. C4 may be the same as, or different from, any one of c1, c2, or c3. For example, the SRS transmission power of the 3-2$^{nd}$ SRS 1413 may be increased, but this is also exemplary. For example, the electronic device 101 may set the difference between the SRS transmission powers of the SRSs 1411, 1412, 1413, and 1414 to be within a threshold difference. In operation 1309, the electronic device 101 may determine whether an increase in the downlink layers of the NR network is identified. For example, the electronic device 101 may identify the layer when the SRSs 1411, 1412, 1413, and 1414 are transmitted. As the difference between the SRSs 1411, 1412, 1413, and 1414 is not significant, the layer allocated to the electronic device 101 by the network may be increased. If there is no increase in layer (No in 1309), the electronic device 101 may readjust the SRS transmission power of the SRSs. If there is an increase in layer (Yes in 1309), the electronic device 101 may transmit the next SRSs with the adjusted transmission power in operation 1311.

Figure 15:
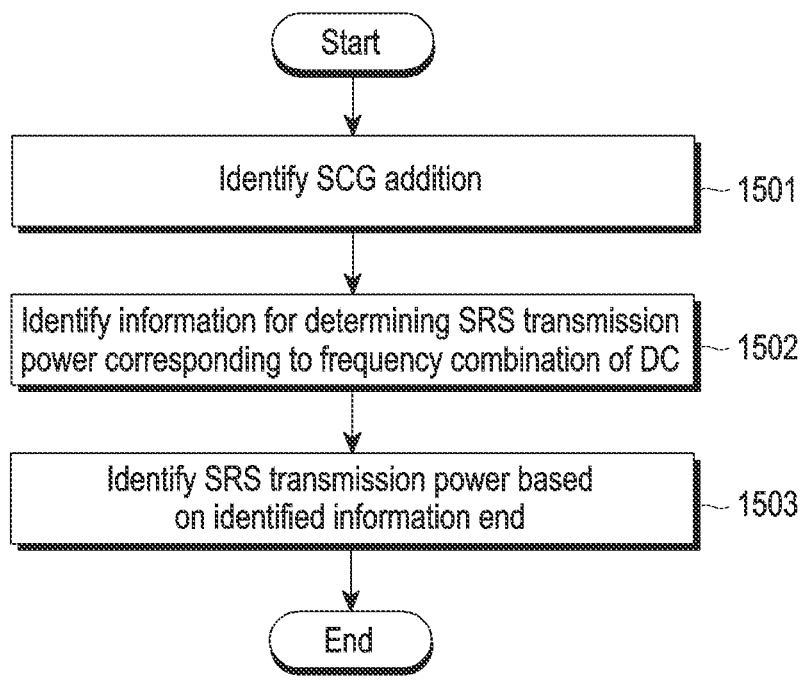
FIG. 15 is a flowchart illustrating an operation method of an electronic device according to an embodiment of the disclosure.

FIG. 15 is a flowchart illustrating an operation method of an electronic device according to an embodiment of the disclosure.

According to various embodiments, an electronic device 101 (e.g., at least one of the processor 120, the first communication processor 212, the second communication processor 214, or the integrated communication processor 260) may identify SCG addition in operation 1501. The electronic device 101 may receive, e.g., an RRC reconfiguration message for configuring SCG addition from a network. The electronic device 101 may identify, e.g., the frequency band of NR communication from the RRC reconfiguration message in operation 1502. Although not shown, the electronic device 101 may identify the frequency band of LTE communication (or all frequency bands of CA of LTE communication). In operation 1503, the electronic device 101 may identify information for determining the SRS transmission power corresponding to the DC frequency combination. For example, Table 3 is an example of information for determining the SRS transmission power corresponding to the frequency combination.

TABLE 3

| Frequency combination | Antenna port 1 | Antenna port 2 | Antenna port 3 | Antenna port 4 |
| --- | --- | --- | --- | --- |
| NR: n78LTE: B1/B3/B7 | 18 dBm | 16 dBm | 17 dBm | 18 dBm |
| NR: n78LTE: B1/B5/B7 | 19 dBm | 19 dBm | 17 dBm | 18 dBm |

The electronic device 101 may store the SRS transmission power for each antenna port and for each frequency combination as illustrated in Table 3, for example. The electronic device 101 may store the SRS transmission power, identified according to the embodiment of FIG. 11 or FIG. 13, corresponding to the frequency combination. The electronic device 101 may set the SRS transmission power as illustrated in Table 3, as the maximum power during the process of determining the SRS transmission power. In operation 1505, the electronic device 101 may identify the SRS transmission power based on the identified information. Accordingly, the electronic device 101 may directly set the SRS transmission power without repeating the operations of FIG. 11 or FIG. 13. The electronic device 101 may set the SRS transmission power based on the stored information as illustrated in Table 3 and may then perform fine-tuning. Fine-tuning may be, e.g., the operations of FIG. 11 or FIG. 13.

Figure 16:
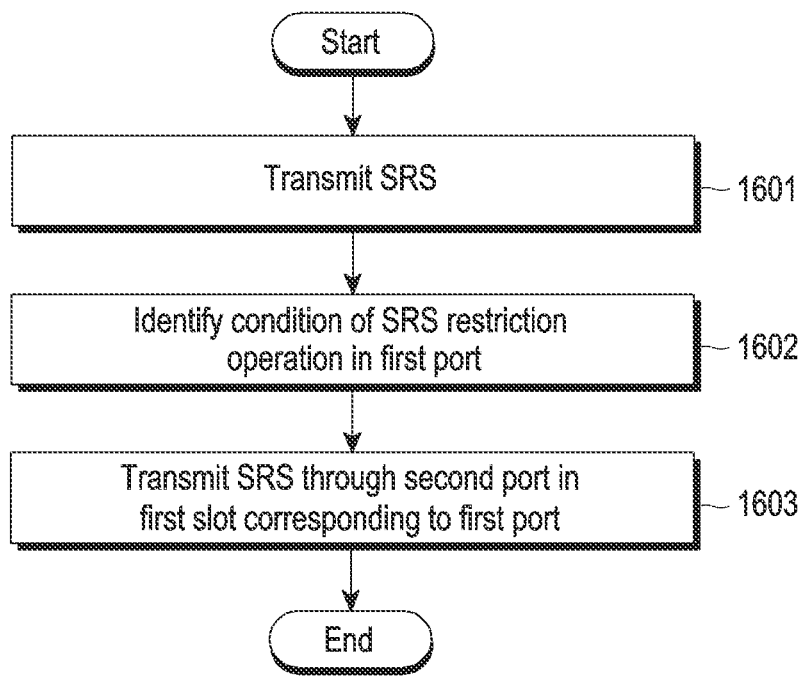
FIG. 16 is a flowchart illustrating an operation method of an electronic device according to an embodiment of the disclosure.

FIG. 16 is a flowchart illustrating an operation method of an electronic device according to an embodiment of the disclosure.

According to various embodiments, an electronic device 101 (e.g., at least one of the processor 120, the first communication processor 212, the second communication processor 214, or the integrated communication processor 260) may transmit an SRS in operation 1601. In operation 1602, the electronic device 101 may identify a condition of an SRS restriction operation in a first port. For example, the electronic device 101 may identify that a condition (e.g., the BLER of LTE communication meets a designated condition and/or the ratio of the data throughput of LTE communication to the overall data throughput is a threshold ratio or more) of the SRS restriction operation associated with LTE communication is met while the SRS is transmitted through the first port. In operation 1603, the electronic device 101 may transmit an SRS through a second port in a first slot corresponding to the first port. If the electronic device 101 supports 1T4R and is configured to transmit SRSs in the order of the first port, the second port, the third port, and the fourth port, the electronic device 101 may transmit SRSs in the order of the first port, the second port, the third port, and the fourth port. For example, the electronic device 101 may transmit the SRS through the port having the lowest BLER instead of the first port, but embodiments are not limited thereto.

Figure 17:
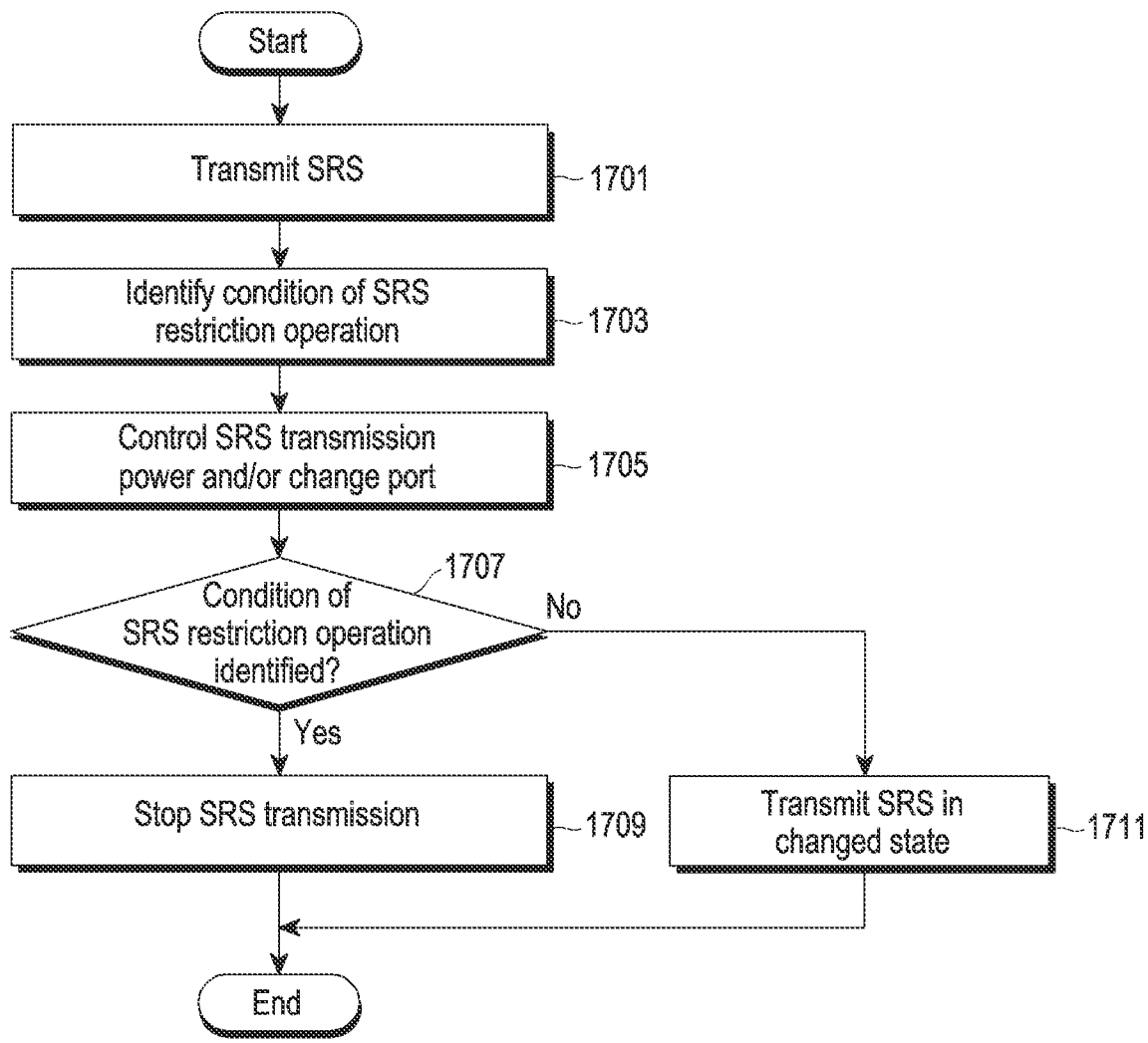
FIG. 17 is a flowchart illustrating an operation method of an electronic device according to an embodiment of the disclosure.

FIG. 17 is a flowchart illustrating an operation method of an electronic device according to an embodiment of the disclosure.

According to various embodiments, an electronic device 101 (e.g., at least one of the processor 120, the first communication processor 212, the second communication processor 214, or the integrated communication processor 260) may transmit an SRS in operation 1701. In operation 1703, the electronic device 101 may identify a condition of an SRS restriction operation. For example, the electronic device 101 may identify that the BLER of LTE communication meets a designated condition and/or that the ratio of the data throughput of LTE communication to the overall data throughput is equal to or greater than a threshold ratio. In operation 1705, the electronic device 101 may control the SRS transmission power as in the embodiment of FIG. 11 or 13 and/or change the port as in the embodiment of FIG. 16.

According to various embodiments, the electronic device 101 may determine whether a condition of an SRS restriction operation is identified in operation 1707. If the condition of the SRS restriction operation is still identified (Yes in 1707), the electronic device 101 may stop SRS transmission in operation 1709. The electronic device 101 may stop SRS transmission if the condition of the restricted operation is still identified after performing the SRS restriction operation once. In another example, the electronic device 101 may be configured to stop SRS transmission if the condition of the restriction operation is still identified even after the SRS restriction operation is performed a designated number of times. Alternatively, the electronic device 101 may be configured to immediately stop SRS transmission in response to first identification of the condition of the SRS restriction operation. In one embodiment, the electronic device 101 may be configured to immediately stop SRS transmission when the BLER of LTE communication is significantly high. The stopping of SRS transmission may be the SRS restriction operation. For example, the electronic device 101 may set a plurality of thresholds for the BLER of LTE communication. A plurality of ranges may be set in the BLER by the plurality of thresholds. The electronic device 101 may selectively perform any one of adjustment of the SRS transmission power, changing of the port, and stopping of SRS transmission according to the range including the BLER of LTE communication measured. If the condition of the SRS restriction operation is still not identified (No in 1707), the electronic device 101 may transmit the SRS in a changed state (e.g., a change in SRS transmission power and/or a change in port) in operation 1711.

According to various embodiments, when it is determined to stop SRS transmission, the electronic device 101 may report a UE capability indicating that SRS transmission is not supported to the network. For example, the electronic device 101 may report a UE capability indicating that SRS transmission is not supported based on a tracking area update (TAU) procedure. For example, the electronic device 101 may change the supportedSRS-TxPortSwitch from "t1r4" to "notsupported".

According to various embodiments, an electronic device comprises a plurality of antennas and at least one processor configured to support long-term evolution (LTE) communication and new radio (NR) communication. The at least one processor may be configured to identify at least one time of transmission of a sounding reference signal (SRS) set in the NR communication, transmitted through each of the plurality of antennas, identify at least one time of the LTE communication corresponding to the at least one time of transmission of the SRS, identify a block error rate (BLER) of the LTE communication in at least one frequency band associated with the LTE communication simultaneously in use with the NR communication, at the at least one time of the LTE communication, and based on the BLER satisfying a designated condition, perform an SRS restriction operation.

According to various embodiments, the at least one processor may be configured to, as at least part of identifying the BLER of the LTE communication, identify the BLER in the at least one frequency band corresponding to a component carrier associated with carrier aggregation (CA) of the LTE communication.

According to various embodiments, the at least one processor may be configured to, as at least part of based on the BLER satisfying a designated condition, performing the SRS restriction operation, based on identifying that the BLER is more than or equal to a designated threshold BLER, perform the SRS restriction operation.

According to various embodiments, the at least one processor may be configured to, as at least part of based on the BLER satisfying the designated condition, performing the SRS restriction operation, identify a BLER for comparison at a time of reception other than a time of reception of the LTE communication corresponding to the at least one time of transmission of the SRS, and determine whether the BLER satisfies the designated condition based on a result of comparison between the BLER and the BLER for the comparison.

According to various embodiments, the at least one processor may be configured to, as at least part of based on the BLER satisfying the designated condition, performing the SRS restriction operation, identify a first data throughput corresponding to the LTE communication based on the BLER meeting the designated condition, identify a second data throughput corresponding to the NR communication, based on the ratio of the first data throughput being more than or equal to a threshold ratio, identify a ratio of the first data throughput to a sum of the first data throughput and the second data throughput, and perform the SRS restriction operation.

According to various embodiments, the at least one processor may be further configured to identify a first SRS transmission power of the SRS. The at least one processor may be configured to, as at least part of identifying the BLER, identify the BLER corresponding to each of the at least one frequency band associated with the LTE communication while the SRS is transmitted in the first SRS transmission power.

According to various embodiments, the at least one processor may be configured to, as at least part of based on the BLER satisfying the designated condition, performing the SRS restriction operation, adjust the first SRS transmission power of the SRS to a second SRS transmission power.

According to various embodiments, the at least one processor may be configured to, as at least part of adjusting the first SRS transmission power of the SRS to the second SRS transmission power, based on applying a predesignated amount of adjustment to the first SRS transmission power, identify the second SRS transmission power.

According to various embodiments, the at least one processor may be configured to, upon transmitting the SRS in the second SRS transmission power, identify a reduction in a number of downlink layers of the NR communication set in the electronic device, and based on identifying the reduction in the number of the downlink layers, change the SRS transmission power from the second SRS transmission power to a third SRS transmission power.

According to various embodiments, the at least one processor may be configured to, as at least part of adjusting the first SRS transmission power of the SRS to the second SRS transmission power, identify the second SRS transmission power pre-stored corresponding to a combination of at least one frequency corresponding to the LTE communication and at least one frequency corresponding to the NR communication.

According to various embodiments, the adjusting of the first SRS transmission power of the SRS may be repeatedly performed until the designated condition is not satisfied.

According to various embodiments, the at least one processor may be configured to, as at least part of based on the BLER satisfying the designated condition, performing the SRS restriction operation, identify that a BLER at a first time of reception of the LTE communication corresponding to a first time of transmission of the SRS corresponding to a first antenna among the plurality of antennas satisfies the designated condition, and transmit the SRS through an antenna, other than the first antenna, among the plurality of antennas at the first time of transmission of the SRS.

According to various embodiments, the at least one processor may be configured to, as at least part of based on the BLER satisfying the designated condition, performing the SRS restriction operation based on the BLER meeting the designated condition, stop the transmission of the SRS.

According to various embodiments, the at least one processor may be further configured to report a UE capability indicating that the electronic device does not support the SRS to a network based on the stopping of the transmission of the SRS.

According to various embodiments, a method for operating an electronic device including a plurality of antennas supporting NR communication and LTE communication comprises: identifying at least one time of transmission of a sounding reference signal (SRS) set in the NR communication, transmitted through each of the plurality of antennas, identifying at least one time of the LTE communication corresponding to the at least one time of transmission of the SRS, identifying a block error rate (BLER) of the LTE communication in at least one frequency band associated with the LTE communication simultaneously in use with the NR communication, at the at least one time of the LTE communication, and based on the BLER satisfying a designated condition, performing an SRS restriction operation.

According to various embodiments, based on the BLER satisfying the designated condition, performing the SRS restriction operation may comprise performing the SRS restriction operation based on identifying that the BLER is a designated threshold BLER or more.

According to various embodiments, based on the BLER satisfying the designated condition, performing the SRS restriction operation may comprise: identifying a BLER for comparison at a time of reception other than a time of reception of the LTE communication corresponding to the at least one time of transmission of the SRS, and determining whether the BLER satisfies the designated condition based on a result of comparison between the BLER and the BLER for the comparison.

According to various embodiments, based on the BLER meeting the designated condition, performing the SRS restriction operation may comprise: based on the BLER meeting the designated condition, identifying a first data throughput corresponding to the LTE communication, identifying a second data throughput corresponding to the NR communication, identifying a ratio of the first data throughput to a sum of the first data throughput and the second data throughput, and based on the ratio of the first data throughput being more than or equal to a threshold ratio, performing the SRS restriction operation.

According to various embodiments, the method may further comprise identifying a first SRS transmission power of the SRS. Identifying the BLER may comprise identifying the BLER corresponding to each of the at least one frequency band associated with the LTE communication while the SRS is transmitted in the first SRS transmission power.

According to various embodiments, based on the BLER meeting the designated condition, performing the SRS restriction operation may comprise adjusting the first SRS transmission power of the SRS to a second SRS transmission power.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
  a plurality of antennas supporting new radio (NR) communication and long-term evolution (LTE) communication; and
  at least one processor configured to:
    identify at least one time of transmission of a sounding reference signal (SRS) set in the NR communication, transmitted through each of the plurality of antennas,
    identify at least one time of the LTE communication corresponding to the at least one time of transmission of the SRS,
    identify a block error rate (BLER) of the LTE communication in at least one frequency band associated with the LTE communication simultaneously in use with the NR communication, at the at least one time of the LTE communication, and
    based on the BLER satisfying a designated condition, perform an SRS restriction operation
  wherein, based on the BLER satisfying the designated condition, the at least one processor is further configured to:
    identify a first data throughput corresponding to the LTE communication,
    identify a second data throughput corresponding to the NR communication,
    identify a ratio of the first data throughput to a sum of the first data throughput and the second data throughput, and
    perform the SRS restriction operation based on the ratio of the first data throughput being more than or equal to a threshold ratio.

2. The electronic device of claim 1, wherein the at least one frequency band corresponds to a component carrier associated with carrier aggregation (CA) of the LTE communication.

3. The electronic device of claim 1, wherein the designated condition is satisfied in case the BLER is more than or equal to a designated threshold BLER.

4. The electronic device of claim 3, wherein the at least one processor is further configured to:
  identify a BLER for comparison at a time of reception other than a time of reception of the LTE communication corresponding to the at least one time of transmission of the SRS, and
  determine whether the BLER satisfies the designated condition based on a result of comparison between the BLER and the BLER for the comparison.

5. The electronic device of claim 1,
  wherein the at least one processor is further configured to:
    identify a first SRS transmission power of the SRS, and identify the BLER corresponding to each of the at least one frequency band associated with the LTE communication while the SRS is transmitted in the first SRS transmission power.

6. The electronic device of claim 5, wherein the at least one processor is further configured to:
adjust the first SRS transmission power of the SRS to a second SRS transmission power.

7. The electronic device of claim 6, wherein the at least one processor is further configured to:
based on applying a predesignated amount of adjustment to the first SRS transmission power, identify the second SRS transmission power.

8. The electronic device of claim 7, wherein the at least one processor is further configured to:
upon transmitting the SRS in the second SRS transmission power, identify a reduction in a number of downlink layers of the NR communication set in the electronic device; and
based on identifying the reduction in the number of the downlink layers, change an SRS transmission power from the second SRS transmission power to a third SRS transmission power.

9. The electronic device of claim 7, wherein the at least one processor is further configured to:
identify the second SRS transmission power pre-stored corresponding to a combination of at least one frequency corresponding to the LTE communication and at least one frequency corresponding to the NR communication.

10. The electronic device of claim 6, wherein the first SRS transmission power of the SRS is repeatedly adjusted until the designated condition is not satisfied.

11. The electronic device of claim 1, wherein the at least one processor is further configured to:
identify that a BLER at a first time of reception of the LTE communication corresponding to a first time of transmission of the SRS corresponding to a first antenna among the plurality of antennas satisfies the designated condition; and
transmit the SRS through an antenna, other than the first antenna, among the plurality of antennas at the first time of transmission of the SRS.

12. The electronic device of claim 1, wherein the at least one processor is further configured to:
stop the transmission of the SRS.

13. The electronic device of claim 12, wherein the at least one processor is further configured to report a UE capability indicating that the electronic device does not support the SRS to a network in case the transmission of the SRS is stopped.

14. A method for operating an electronic device including a plurality of antennas supporting new radio (NR) communication and long-term evolution (LTE) communication, the method comprising:
identifying at least one time of transmission of a sounding reference signal (SRS) set in the NR communication, transmitted through each of the plurality of antennas;
identifying at least one time of the LTE communication corresponding to the at least one time of transmission of the SRS;
identifying a block error rate (BLER) of the LTE communication in at least one frequency band associated with the LTE communication simultaneously in use with the NR communication, at the at least one time of the LTE communication; and
based on the BLER satisfying a designated condition, performing an SRS restriction operations,
wherein the performing of the SRS restriction operation based on the BLER meeting the designated condition comprises:
identifying a first data throughput corresponding to the LTE communication;
identifying a second data throughput corresponding to the NR communication;
identifying a ratio of the first data throughput to a sum of the first data throughput and the second data throughput; and
based on the ratio of the first data throughput being more than or equal to a threshold ratio, performing the SRS restriction operation.

15. The method of claim 14, wherein the performing of the SRS restriction operation based on the BLER satisfying the designated condition comprises:
performing the SRS restriction operation based on identifying that the BLER is a designated threshold BLER or more.

16. The method of claim 14, wherein the performing of the SRS restriction operation based on the BLER satisfying the designated condition comprises:
identifying a BLER for comparison at a time of reception other than a time of reception of the LTE communication corresponding to the at least one time of transmission of the SRS; and
determining whether the BLER satisfies the designated condition based on a result of comparison between the BLER and the BLER for the comparison.

17. The method of claim 14, further comprising:
identifying a first SRS transmission power of the SRS, wherein the identifying of the BLER comprises:
identifying the BLER corresponding to each of the at least one frequency band associated with the LTE communication while the SRS is transmitted in the first SRS transmission power.

18. The method of claim 17, wherein the performing of the SRS restriction operation based on the BLER meeting the designated condition comprises:
adjusting the first SRS transmission power of the SRS to a second SRS transmission power.

19. The method of claim 14, wherein the at least one time of transmission of the SRS set is identified based on an SRS configuration received from a network.

20. The method of claim 19, wherein the SRS configuration includes periodicity, offset and duration for the SRS transmitted through each of the plurality of antennas.

21. The method of claim 19, wherein the at least one time of transmission comprises at least one SRS slot.

* * * * *